United States Patent
Lee et al.

(10) Patent No.: US 10,972,662 B2
(45) Date of Patent: Apr. 6, 2021

(54) METHOD FOR PROVIDING DIFFERENT INDICATOR FOR IMAGE BASED ON SHOOTING MODE AND ELECTRONIC DEVICE THEREOF

(71) Applicant: Samsung Electronics Co., Ltd., Suwon-si (KR)

(72) Inventors: Wooyong Lee, Hwaseong-si (KR); Yunson Yoo, Suwon-si (KR); Donghoon Jang, Suwon-si (KR); Beomjoon Kwon, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/923,923

(22) Filed: Mar. 16, 2018

(65) Prior Publication Data
US 2018/0270420 A1    Sep. 20, 2018

(30) Foreign Application Priority Data
Mar. 17, 2017 (KR) .................. 10-2017-0033653

(51) Int. Cl.
*H04N 5/232* (2006.01)
*H04N 5/225* (2006.01)

(52) U.S. Cl.
CPC ....... *H04N 5/23245* (2013.01); *H04N 5/2258* (2013.01); *H04N 5/23216* (2013.01);
(Continued)

(58) Field of Classification Search
CPC ............ H04N 5/23245; H04N 5/2258; H04N 5/232933; H04N 5/23293; H04N 5/23216; H04N 5/23296
See application file for complete search history.

(56) References Cited

U.S. PATENT DOCUMENTS

2010/0097488 A1* 4/2010 Suzuki .................. H04N 5/772
348/222.1
2011/0043650 A1 2/2011 Fukuyama
(Continued)

FOREIGN PATENT DOCUMENTS

JP       2010136446 A    6/2010
JP       2011101164 A  * 5/2011 ............. H04N 5/235
(Continued)

OTHER PUBLICATIONS

ISA/KR, "International Search Report and Written Opinion of the International Searching Authority," International Application No. PCT/KR2018/002913, dated Jun. 21, 2018, 9 pages.
(Continued)

*Primary Examiner* — Nhan T Tran

(57) ABSTRACT

The present disclosure relates to a method and apparatus for providing a camera service by an electronic device. The electronic device may include a camera, a memory, and at least one processor, the processor configured to control the electronic device to: receive a camera shooting request; display a preview image of an external object obtained through the camera using first area information based on a first shooting mode in response to the shooting request; receive an input corresponding to a second shooting mode in the first shooting mode; and display the preview using second area information corresponding to the second shooting mode in response to the input.

20 Claims, 20 Drawing Sheets

(52) U.S. Cl.
CPC ..... *H04N 5/23293* (2013.01); *H04N 5/23296* (2013.01); *H04N 5/232933* (2018.08)

(56) References Cited

U.S. PATENT DOCUMENTS

| | | | |
|---|---|---|---|
| 2012/0274830 A1* | 11/2012 | Kameyama | ........ H04N 5/23209 348/333.02 |
| 2017/0013179 A1* | 1/2017 | Kang | ................... H04N 5/2259 |
| 2018/0227489 A1 | 8/2018 | Ho | |

FOREIGN PATENT DOCUMENTS

| | | | |
|---|---|---|---|
| JP | 2011103531 A | 5/2011 | |
| JP | 2012235232 A | 11/2012 | |
| JP | 5448726 B2 | 3/2014 | |
| JP | 2016-123033 A | 7/2016 | |
| JP | 2017-017376 A | 1/2017 | |
| KR | 1997-0056959 A | 7/1997 | |
| KR | 10-2017-0006559 A | 1/2017 | |

OTHER PUBLICATIONS

Supplementary European Search Report in connection with European Application No. 18767601.0 dated Feb. 13, 2020, 9 pages.
Notice of Preliminary Rejection dated Jan. 26, 2021 in connection with Korean Application No. 10-2017-0033653, 13 pages.

\* cited by examiner

METHOD FOR PROVIDING DIFFERENT INDICATOR FOR IMAGE BASED ON SHOOTING MODE AND ELECTRONIC DEVICE THEREOF

CROSS-REFERENCE TO RELATED APPLICATION

This application claims the priority under 35 U.S.C. § 119(a) to Korean Patent Application Serial No. 10-2017-0033653, which was filed in the Korean Intellectual Property Office on Mar. 17, 2017, the entire contents of which is hereby incorporated by reference.

TECHNICAL FIELD

The present disclosure relates to a method and apparatus for providing a camera service that supports a plurality of shooting modes in which an electronic device shoots images of different sizes.

BACKGROUND

With the development of information and communication technologies and semiconductor technologies, various types of electronic devices have developed into multimedia devices that provide various multimedia services. For example, the multimedia services may include various services such as a voice call service, a messenger service, a broadcasting service, a wireless Internet service, a camera service, a music reproduction service, and the like.

An electronic device may provide a camera service desired by a user using at least one camera electronically connected to the electronic device. For example, the electronic device may obtain a picture or a video using at least one camera.

SUMMARY

An electronic device may shoot (obtain) a picture or a video through a single camera service screen (a preview image) without distinguishing between a picture-shooting mode and a video-shooting mode. For example, the electronic device may display, on a display, an image (e.g., a preview image) collected through a camera, the view angle of which is set to correspond to a shooting mode. When an input corresponding to picture shooting is received in the state in which a preview image corresponding to a shooting mode is displayed, the electronic device may obtain (capture) a picture corresponding to the point in time at which the input is received. When an input corresponding to video shooting is received in the state in which a preview image corresponding to a shooting mode is displayed, the electronic device can start shooting a video. For example, the shooting mode may include a picture-shooting mode or a video-shooting mode.

However, when camera view angles (or image sizes) corresponding to a picture-shooting mode and a video-shooting mode of the electronic device are set differently from each other, the user of the electronic device may have difficulty in setting the composition for image shooting. For example, when the electronic device operates in the picture-shooting mode, the electronic device may display, on the display, a preview image corresponding to a predetermined picture size (e.g., having an aspect ratio of 4:3). When an input corresponding to video shooting is received, the electronic device shoots a video in a predetermined size (e.g., having an aspect ratio of 16:9), whereby a view angle difference may exist. Accordingly, the user of the electronic device may have difficulty in setting the composition for video shooting.

Also, the electronic device may provide video stabilization for correcting shaking of a video. When such video stabilization is provided, a relatively larger change occurs in a view angle, whereby the user may have difficulty in shooting an image.

Various embodiments of the present disclosure may provide a method and apparatus by which an electronic device provides image size change information corresponding to a change in the view angle of a camera.

According to various embodiments of the present disclosure, an electronic device may include: a camera; a display; a memory; and at least one processor, the processor being configured to perform: displaying, on the display, a plurality of images of an external object obtained using the camera; receiving an input associated with shooting while the plurality of images is displayed; when the input corresponds to a first shooting mode, displaying, on the display, a first indicator corresponding to a property of the first shooting mode to at least temporarily overlap the plurality of images; when the input corresponds to a second shooting mode, displaying, on the display, a second indicator corresponding to a property of the second shooting mode to at least temporarily overlap the plurality of images; and storing at least a part of the plurality of images in the memory based on at least a corresponding shooting mode selected from among the first shooting mode and the second shooting mode.

According to various embodiments of the present disclosure, an operation method of an electronic device may include: displaying, on a display, a plurality of images of an external object obtained using a camera electrically connected to the electronic device; receiving an input associated with shooting while the plurality of images is displayed; when the input corresponds to the first shooting mode, displaying, on the display, a first indicator corresponding to a property of the first shooting mode to at least temporarily overlap the plurality of images; when the input corresponds to the second shooting mode, displaying, on the display, a second indicator corresponding to a property of the second shooting mode to at least temporarily overlap the plurality of images; and storing at least a part of the plurality of images in a memory of the electronic device based on at least a corresponding shooting mode selected from among the first shooting mode and the second shooting mode.

According to various embodiments of the present disclosure, an electronic device may include: a camera; a memory; and at least one processor, the processor performing control to: receive a camera shooting request; display a preview of an external object obtained through the camera using first area information based on a first shooting mode in response to the shooting request; receive an input corresponding to a second shooting mode in the first shooting mode; and display the preview using second area information corresponding to the second shooting mode in response to the input.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
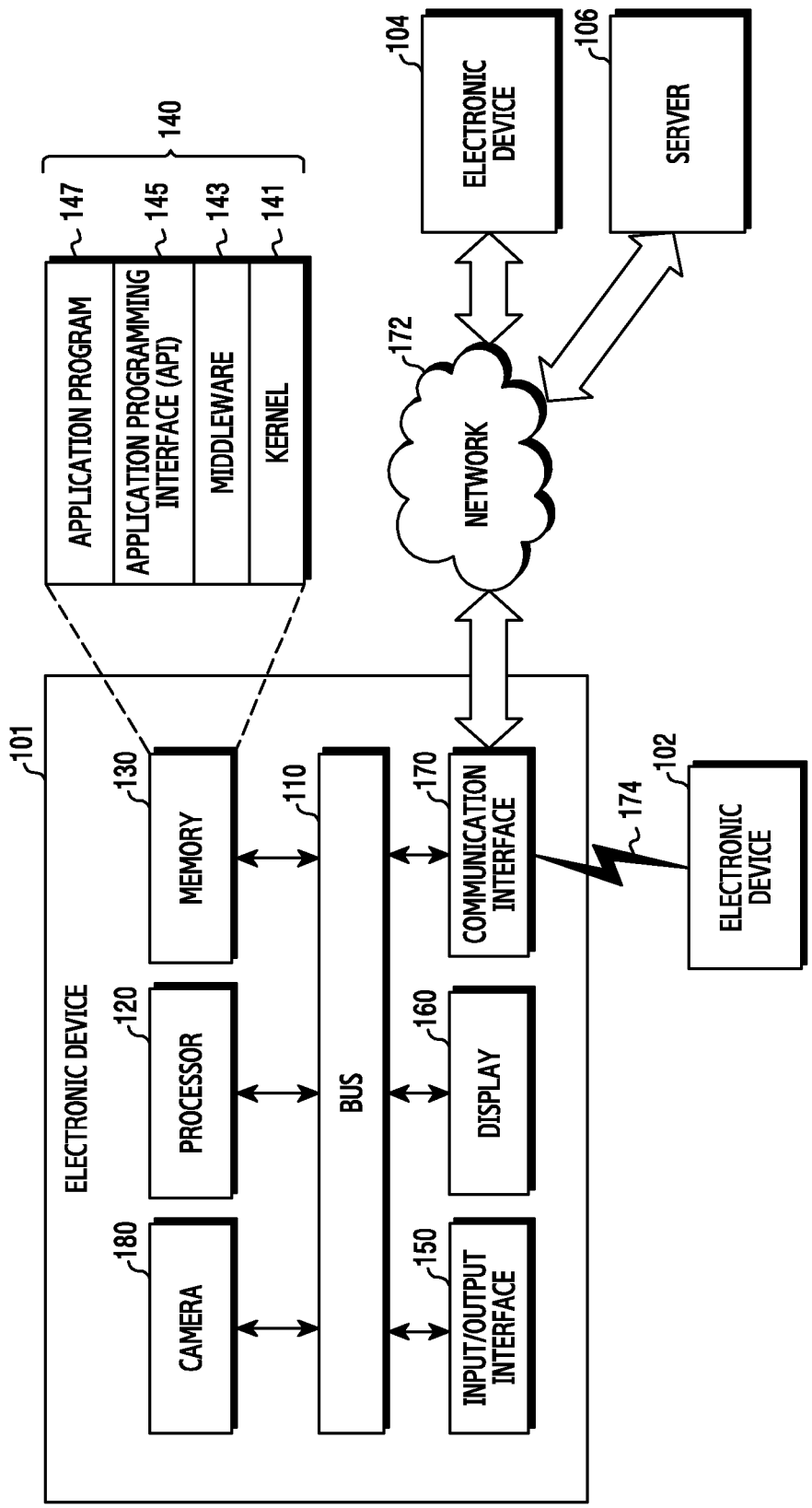
FIG. 1A illustrates a diagram of an electronic device in a network environment according to various embodiments of the present disclosure.

FIGS. 1A through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various exemplary embodiments of the present document are described with reference to the accompanying drawings. It should be understood, however, that it is not intended to limit the various exemplary embodiments of the present document to the particular form disclosed, but, on the contrary, it is intended to cover all modifications, equivalents, and alternatives falling within the spirit and scope of the various exemplary embodiments of the present document. Like reference numerals denote like components throughout the drawings. A singular expression includes a plural concept unless there is a contextually distinctive difference therebetween.

In the present document, an expression "A or B", "A and/or B", or the like may include all possible combinations of items enumerated together. Although expressions such as "$1^{st}$" "$1^{nd}$" "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., 3$^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™, an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1A illustrates an electronic device 101 in a network environment according to various embodiments of the present disclosure.

Referring to FIG. 1A, the electronic device 101 may include a bus 110, a processor 120 (e.g., including processing circuitry), a memory 130, an input/output interface 150 (e.g., including input/output circuitry), a display 160 (e.g., including display circuitry), a communication interface 170 (e.g., including communication circuitry), and a camera 180. In some embodiments, the electronic device 101 may omit at least one of the elements, or may further include other elements.

The bus 110 may include a circuit that interconnects the elements 120 to 180 and transfers communication (e.g., control messages and/or data) between the elements.

The processor 120 may include one or more of a central processing unit (CPU), an application processor (AP), a communication processor (CP), and an image-signal processor (ISP). For example, the processor 120 may execute calculations or data processing about controls and/or communication of at least one other element of the electronic device 101.

According to an embodiment, the processor 120 may perform control such that a preview image corresponding to a shooting mode using the camera 180 is displayed. For example, when occurrence of an event for providing a camera service is detected, the processor 120 may perform control such that the camera 180 is activated. When the camera 180 is activated, the processor 120 may control the display 160 such that a preview image is displayed based on first area information corresponding to a first shooting mode. For example, the first area information is area information for displaying an image in a predetermined size of the first shooting mode, and may be determined based on the ratio of the preview image of the first shooting mode and the reference length (e.g., a landscape-orientation length) of a display area of the display 160. For example, when an input corresponding to a second shooting mode is received in the state in which the preview image corresponding to the first shooting mode is displayed, the processor 120 may control the display 160 such that the preview image is displayed based on second area information corresponding to the second shooting mode. In other words, the processor 120 may update the preview image corresponding to the first area information displayed on the display 160 to correspond to the second area information. For example, the second area information may be area information for displaying an image in a predetermined size of the second shooting mode, and may be determined based on the ratio of a preview image of the second shooting mode and the reference length (e.g., a landscape-orientation length) of the display area of the display 160. For example, the input corresponding to the second shooting mode may include at least one of a press on a hardware button corresponding to the second shooting mode, a touch (touch-down) on a software button, a force touch (force touch-down), a gesture input, a voice input, and a macro instruction.

According to an embodiment, the processor 120 may determine whether to convert the preview image when the input corresponding to the second shooting mode is received in the state in which the preview image corresponding to the first shooting mode is displayed. For example, the processor 120 may compare the first area information and the second area information, and may determine whether to convert the preview image. For example, when the first area information and the second area information are different, the processor 120 may determine to convert the preview image. For example, when the view angle of the camera 180, which corresponds to the second area information, is equal to or greater than the view angle of the camera 180, which corresponds to the first area information, the processor 120 may determine not to convert the preview image.

According to an embodiment, the processor 120 may convert the preview image such that an image collected through the camera 180 corresponds to the second area information corresponding to the second shooting mode. For example, when the input corresponding to the second shooting mode is received in the state in which the preview image corresponding to the first shooting mode is displayed, the processor 120 may edit the image collected through the camera 180 so as to correspond to the second area information. The processor 120 may control the display 160 such that the image edited to correspond to the second area information is displayed. For example, the processor 120 may collect an image having an aspect ratio of 4:3 through the camera 180. The processor 120 may control the display 160 to display a preview image at a ratio of 4:3, which is collected through the camera 180 based on a picture-shooting mode (e.g., the first shooting mode). When an input corresponding to a video-shooting mode (e.g., the second shooting mode) is received in the state in which the preview image corresponding to the picture-shooting mode is displayed, the processor 120 may determine the size of a view angle control area based on the size of a video having an aspect ratio of 16:9. For example, the processor 120 may control the display 160 such that a part corresponding to the view angle control area is cut from the preview image having an aspect ratio of 4:3 and a preview image having an aspect ratio of 16:9 is displayed. For example, the processor 120 may control the display 160 such that a view angle control area is additionally displayed in the preview image having an aspect ratio of 4:3, which corresponds to the picture-shooting mode displayed in the display 160. For example, the processor 120 may control the display 160 such that an image having an aspect ratio of 4:3 which is collected through the camera 180 based on the video-shooting mode (e.g., the first shooting mode) is converted into a preview image having an aspect ratio of 16:9, and the preview image is displayed. When an input corresponding to the picture-shooting mode (e.g., the second shooting mode) is received in the state in which a preview image corresponding to the video-shooting mode is displayed, the processor 120 may control the display 160 such that a preview image having an aspect ratio of 4:3, which is collected through the camera 180 based on a picture size having an aspect ratio of 4:3, is displayed.

According to an embodiment, the processor 120 may perform control such that a preview image of the second area information corresponding to the second shooting mode is displayed using a preview image of the first shooting mode. For example, when an input corresponding to the second shooting mode is received in the state in which the preview image corresponding to the first shooting mode is displayed, the processor 120 may reset the camera 180 to correspond to the second shooting mode. While the camera 180 is reset, the processor 120 may control the display 160 such that a captured image of the preview image corresponding to the first shooting mode is edited to correspond to the second area information, and the edited image may be displayed. For example, the processor 120 may collect an image having an aspect ratio of 4:3 through the camera 180. The processor 120 may control the display 160 to display a preview image having an aspect ratio of 4:3, which is collected through the camera 180 based on the picture-shooting mode (e.g., the first shooting mode). When an input corresponding to the video-shooting mode (e.g., the second shooting mode) is received in the state in which the preview image corresponding to the picture-shooting mode is displayed, the processor 120 may capture an image having an aspect ratio of 4:3. The processor 120 may determine the size of the view angle control area based on the size of a video having an aspect ratio of 16:9. For example, the processor 120 may control the display 160 such that a part corresponding to the view angle control area is cut from the captured image having an aspect ratio of 4:3, and an image having an aspect ratio of 16:9 is displayed. For example, the processor 120 may control the display 160 such that the view angle control area is additionally displayed in the captured image displayed on the display 160. When the camera 180 is completely reset, the processor 120 may control the display 160 such that the captured image displayed on the display 160 is converted to an image collected through the camera 180.

According to an embodiment, the processor 120 may perform control such that a preview image collected through a camera corresponding to a shooting mode is displayed when a plurality of cameras is included. For example, in the picture-shooting mode, the processor 120 may perform control such that a first camera corresponding to the predetermined image size of the first shooting mode is activated from among a plurality of cameras included in the camera 180. The processor 120 may control the display 160 such that a preview image collected through the first camera is displayed. When an input corresponding to the second shooting mode is received in the state in which the preview image corresponding to the first shooting mode is displayed, the processor 120 may perform control such that a second camera corresponding to the predetermined image size of the second shooting mode is activated. The processor 120 may control the display 160 such that a preview image collected through the second camera is displayed. For example, a camera corresponding to a predetermined image size of a shooting mode may include at least one camera having a view angle at which the predetermined image size of the shooting mode is obtainable.

According to an embodiment, the processor 120 may store an image obtained through the camera 180 when an input for obtaining an image is detected. For example, when an input for obtaining an image is detected, the processor 120 may store a picture or a video obtained at the same view angle as that of a preview image displayed on the display 160. For example, when an input for obtaining an image is detected, the processor 120 may reset the camera 180 to correspond to the size (view angle) of a preview image displayed on the display 160. The processor 120 may store a picture or a video obtained through the reset camera 180. The processor 120 may control the display 160 such that a preview image is captured and the captured image is displayed while the camera 180 is reset. When the camera 180 is completely reset, the processor 120 may control the display 160 such that the captured image displayed on the display 160 is converted to an image collected through the camera 180. The processor 120 may obtain a picture or a video obtained through the camera 180. For example, an input for obtaining an image may include at least one of release of selection of a hardware button or a software button corresponding to a shooting mode, a force touch, a force touch release, a touch movement, a gesture input, a voice input, and a macro instruction. For example, an input for obtaining an image in the second shooting mode may include another input which is subsequently provided after an input corresponding to the second shooting mode.

According to an embodiment, when an input corresponding to picture shooting (obtaining) is detected while video shooting (obtaining) is performed, the processor 120 may obtain a picture at the point in time at which the input is detected. For example, the processor 120 may extract at least a part (e.g., having an aspect ratio of 16:9) of the size (e.g., having an aspect ratio of 4:3) obtained through the camera, and may store the same as a video. For example, when an input corresponding to picture shooting is detected while video shooting is being performed, the processor 120 may capture a picture image in the size (e.g., at an aspect ratio of 16:9) the same as that of the video. For example, when an input corresponding to picture shooting is detected while video shooting is performed, the processor 120 may capture a picture image having the same size as that of the video but having a higher resolution. For example, when input corresponding to picture shooting is detected while video shooting is performed, the processor 120 may capture a picture image corresponding to a predetermined size (e.g., a ratio of 4:3), which is different from that of the video.

The memory 130 may include a volatile and/or non-volatile memory. For example, the memory 130 may store instructions or data related to at least one other element of the electronic device 101. For example, the memory 130 may store at least one of the size, the ratio, or the resolution of an image corresponding to each shooting mode supportable in the electronic device 101.

According to an embodiment, the memory 130 may store software and/or a program 140. The program 140 may include, for example, a kernel 141, middleware 143, an application programming interface (API) 145, or application programs (or "applications") 147. At least some of the kernel 141, the middleware 143, and the API 145 may be referred to as an operating system (OS).

For example, the kernel 141 may control or manage system resources (e.g., the bus 110, the processor 120, the memory 130, or the like) used for executing an operation or function implemented by other programs (e.g., the middleware 143, the API 145, or the application 147). Furthermore, the kernel 141 may provide an interface through which the middleware 143, the API 145, or the application programs 147 may access the individual elements of the electronic device 101 to control or manage system resources.

The middleware 143 may function as, for example, an intermediary for enabling the API 145 or the application programs 147 to communicate with the kernel 141 to exchange data. Furthermore, the middleware 143 may process one or more task requests, which are received from the application programs 147, according to priorities thereof. For example, the middleware 143 may assign priorities to use the system resources (e.g., the bus 110, the processor 120, the memory 130, or the like) of the electronic device 101 to one or more of the application programs 147, and may process one or more task requests. The API 145 is an interface used by the application program 147 to control a function provided from the kernel 141 or the middleware 143, and may include, for example, at least one interface or function (e.g., an instruction) for file control, window control, image processing, character control, or the like.

For example, the input/output interface 150 may forward instructions or data, input from a user or an external device, to the other element(s) of the electronic device 101, or may output instructions or data, received from the other element(s) of the electronic device 101, to the user or the external device. For example, the input/output interface 150 may include at least one physical button, such as a home button, a power button, a volume control button, or the like. For example, the input/output interface 150 may include a speaker for outputting audio signals, and a microphone for collecting audio signals.

The display 160 may display various types of content (e.g., text, images, videos, icons, symbols, or the like) to a user. For example, the display 160 may include a Liquid Crystal Display (LCD), a Light-Emitting Diode (LED) display, an Organic Light-Emitting Diode (OLED) display, a Micro Electro Mechanical System (MEMS) display, or an electronic paper display. For example, the display 160 may include a touch screen. For example, the display 160 may receive a touch, a gesture, proximity, or hovering input using an electronic pen or a body part of a user.

The communication interface 170 may set communication between the electronic device 101 and an external device (e.g., a first external electronic device 102, a second external electronic device 104, or a server 106). For example, the communication interface 170 may be connected to a network 172 through wireless or wired communication to communicate with an external device (e.g., the second external electronic device 104 or the server 106).

According to an embodiment, the wireless communication may include cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication 174 may include, for example, at least one of Wi-Fi, Bluetooth, Bluetooth low energy (BLE), ZigBee, Near Field Communication (NFC), magnetic secure transmission, Radio Frequency (RF), and Body Area Network (BAN). According to an embodiment, the wireless communication may include a GNSS. The GNSS may be, for example, a Global Positioning System (GPS), a Global Navigation Satellite System (GLONASS), a BeiDou Navigation Satellite System (hereinafter, referred to as "Bei-Dou"), or Galileo (the European global satellite-based navigation system). Hereinafter, in this document, the term "GPS" may be interchangeable with the term "GNSS". According to an embodiment, the wired communication may include at least one of a Universal Serial Bus (USB), a High-Definition Multimedia Interface (HDMI), Recommended Standard 232 (RS-232), power line communication, and a Plain Old Telephone Service (POTS). The network 172 may include a telecommunications network, for example, at least one of a computer network (e.g., a LAN or a WAN), the Internet, and a telephone network.

Each of the first and second external electronic devices 102 and 104 may be of a type the same as, or different from, that of the electronic device 101. According to various embodiments, all or some of the operations performed in the electronic device 101 may be performed by another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of, or in addition to, performing the functions or services by itself. Another electronic device (e.g., the electronic device 102 and 104, or the server 106) may execute the requested functions or the additional functions, and may deliver the result of execution thereof to the electronic device 101. The electronic device 101 may provide the received result as it is, or may additionally process the received result to provide the requested functions or services. To this end, for example, cloud-computing, distributed-computing, or client-server-computing technology may be used.

The camera 180 may collect image information of a subject, and may shoot (obtain) a still image (picture) and a video. For example, the camera 180 may shoot a subject according to control of the processor 120. The camera 180 may transfer shot data (e.g., an image) to the display 160 and the processor 120. For example, the camera 180 may include at least one selected from among at least one image sensor, a lens, an image signal processor (ISP), and a flash (e.g., an LED, a xenon lamp, or the like). For example, the image sensor may be implemented as a charge-coupled device (CCD) or a complementary metal-oxide semiconductor (CMOS).

According to an embodiment, the camera 180 may include a plurality of cameras. For example, the camera 180 may include a plurality of cameras that support different view angles in the front side or back side of the electronic device 101. For example, the camera 180 may include a first camera that supports a first view angle range and a second camera that supports a second view angle range in the back side (or the front side) of the electronic device 101. Additionally, the camera 180 may include a third camera in the front side (or the back side).

Figure 1B:
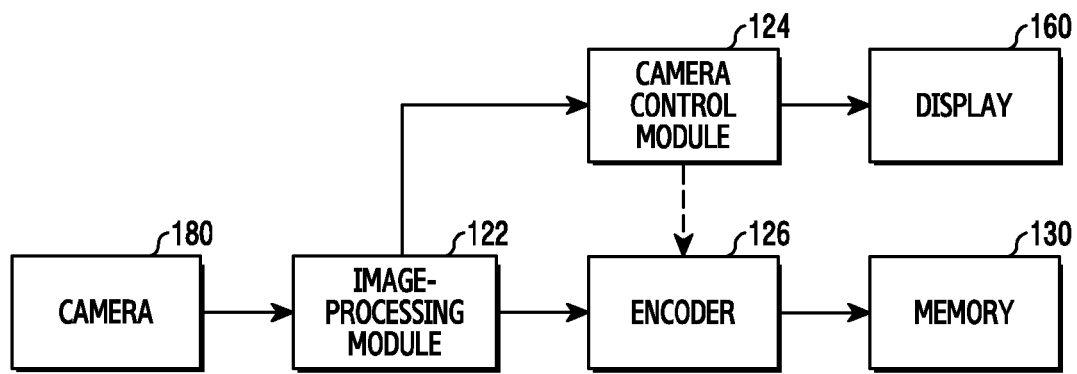
FIG. 1B illustrates a block diagram of an electronic device including one camera according to various embodiments of the present disclosure.

FIG. 1B illustrates a block diagram of an electronic device including one camera according to various embodiments of the present disclosure.

Referring to FIG. 1B, the electronic device 101 may include an image-processing module (e.g., image signal processor (ISP)) 122, a camera control module 124, an encoder 126, the memory 130, the display 160, and the camera 180. Hereinafter, the memory 130, the display 160, and the camera 180 operate in the same manner as in the configuration of FIG. 1A, and thus, a detailed description thereof will be omitted.

The image-processing module 122 may convert an original (e.g., a Bayer pattern image or raw data) image obtained through the camera 180 into a form that a user can recognize (e.g., an YUV image). For example, the image-processing module 122 may process at least one of the exposure, the white balance, and the focus of the original image obtained through the camera 180. The image-processing module 122 may convert the processed original image into a form that is displayable on the display 160.

The camera control module 124 may control the display 160 such that an image provided from the image-processing module 122 is displayed at a size corresponding to a shooting mode. For example, when the shooting mode of the electronic device 101 is a first shooting mode, the camera control module 124 may determine whether the size of the image provided from the image-processing module 122 is the same as first area information corresponding to the first shooting mode. When the size of the image provided from the image-processing module 122 is the same as first area information, the camera control module 124 may control the display 160 such that the image provided from the image-processing module 122 is displayed. When the size of the image provided from the image-processing module 122 is different from the first area information, the camera control module 124 may convert the image provided from the image-processing module 122 to correspond to the first area information. The camera control module 124 may control the display 160 such that a preview image, which is converted to correspond to the first area information, is displayed.

According to an embodiment, when an input corresponding to a second shooting mode is received in the state in which the preview image corresponding to the first shooting mode is displayed, the camera control module 124 may control the display 160 such that a preview image corresponding to the second shooting mode is displayed. For example, when an input corresponding to the second shooting mode is received in the state in which the preview image corresponding to the first shooting mode is displayed, the camera control module 124 may determine whether the first area information and the second area information are the same. When the first area information and the second area information are the same, the camera control module 124 may perform control such that the size of the preview image displayed on the display 160 is maintained. When the first area information and the second area information are different, the camera control module 124 may convert the image provided from the image-processing module 122 so as to correspond to the second area information. The camera control module 124 may control the display 160 such that a preview image corresponding to the second area information is displayed. For example, the camera control module 124 may control the display 160 such that a view angle control area is displayed to overlap the preview image corresponding to the first shooting mode. For example, the camera control module 124 may control the display 160 such that the preview image corresponding to the first shooting mode is displayed after cutting at least a part corresponding to the view angle control area from the preview image. For example, the view angle control area may be determined based on at least one of the size (e.g., view angle) of an image sensor, the size of the display 160 (e.g., the size of a display area), first area information, second area information, the location of a preview image corresponding to the first shooting mode, the location of a preview image corresponding to the second shooting mode, and a video stabilization margin value.

According to an embodiment, the camera control module 124 may control the camera 180 such that the camera 180 is reset based on the conversion of a shooting mode. For example, when an input corresponding to the second shooting mode is received in the state in which the preview image corresponding to the first shooting mode is displayed, the camera control module 124 may control the camera 180 such that the camera 180 is reset based on the second shooting mode. For example, the camera control module 124 may control the display 160 such that the preview image corresponding to the first shooting mode is captured, and the captured image is displayed after cutting at least a part corresponding to a view angle control area from the captured image. When the camera 180 is completely reset, the camera control module 124 may control the display 160 such that an image provided from the image-processing module 122 is displayed. For example, when an input for obtaining an image is received in the state in which at least a part of the image obtained through the camera 180 is displayed as a preview image of the second shooting mode, the camera control module 124 may control the camera 180 such that the camera 180 is reset based on the second shooting mode. For example, the camera control module 124 may control the display 160 such that the preview image corresponding to the second shooting mode is captured and the captured image is displayed. When the camera 180 is completely reset, the camera control module 124 may control the display 160 such that an image provided from the image-processing module 122 is displayed.

According to an embodiment, the camera control module 124 may control the encoder 126 such that an image having a size corresponding to a shooting mode is encoded. For example, the camera control module 124 may control the encoder 126 such that at least a part of an image obtained through the camera 180 is encoded based on a shooting mode of the electronic device 101.

The encoder 126 may encode an image provided from the image-processing module 122 according to a predetermined scheme. For example, the encoder 126 may encode picture data or video data provided from the image-processing module 122 into data in a predetermined file format, such as JPEG, MPEG, or the like. For example, the encoder 126 may extract and encode an image in a size corresponding to an image size for encoding, which is provided from the camera control module 124.

The memory 130 may store a picture or a video encoded by the encoder 126.

According to an embodiment, at least one of the image-processing module 122, the camera control module 124, and the encoder 126 may be included in the processor 120 of FIG. 1A.

Figure 1C:
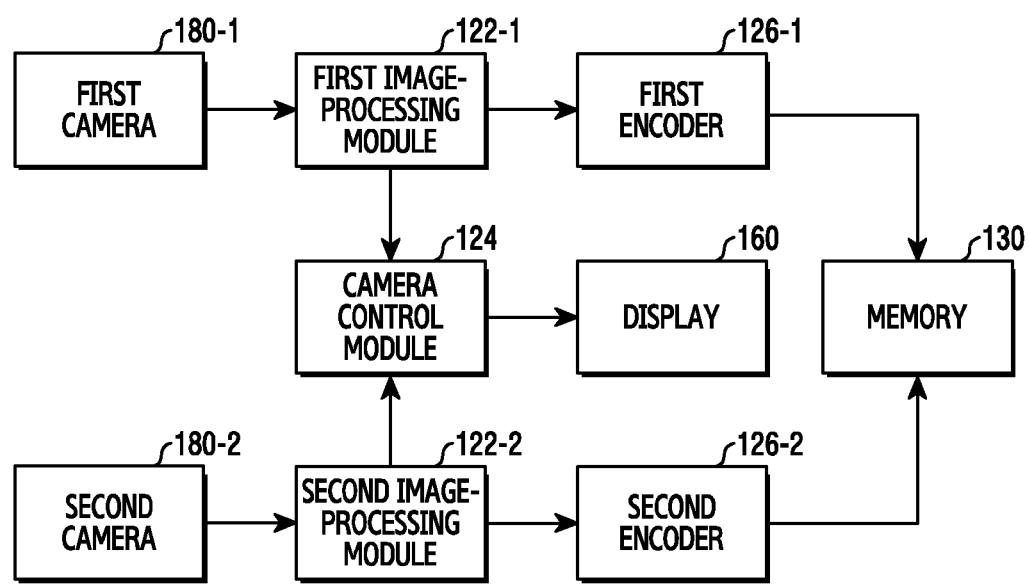
FIG. 1C illustrates a block diagram of an electronic device including a plurality of cameras according to various embodiments of the present disclosure.

FIG. 1C illustrates a block diagram of an electronic device including a plurality of cameras according to various embodiments of the present disclosure.

Referring to FIG. 1C, the electronic device 101 may include image-processing modules (e.g., ISP) 122-1 and 122-2, the camera control module 124, encoders 126-1 and 126-2, the memory 130, the display 160, and cameras 180-1 and 180-2. Hereinafter, the memory 130 and the display 160 operate in the same manner as the configuration of FIG. 1B and thus, a detailed description thereof will be omitted.

The cameras 180-1 and 180-2 are disposed on one side (e.g., the back side or the front side) of the electronic device 101, and may support different view angle ranges. For example, the first camera 180-1 may include a wide-angle lens, and the second camera 180-2 may include a telephoto lens.

The first image-processing module 122-1 may convert an original image collected through the first camera 180-1 into a form that a user can recognize. For example, the first image-processing module 122-1 may process a picture image obtained through the first camera 180-1. The second image-processing module 122-2 may convert an original image collected through the second camera 180-2 into a form that a user can recognize. For example, the second image-processing module 122-2 may process a video obtained through the second camera 180-2.

When the electronic device 101 operates in a picture-shooting mode, the first encoder 126-1 may encode a picture image, which has been processed by the first image-processing module 122-1, according to a predetermined scheme. When the electronic device 101 operates in a video-shooting mode, the second encoder 126-2 may encode a video, which has been processed by the second image-processing module 122-2, according to a predetermined scheme.

The camera control module 124 may control driving of the first camera 180-1 or the second camera 180-2 based on a shooting mode of the electronic device 101. For example, when the electronic device 101 operates in the picture-shooting mode, the image size of which is relatively large, the camera control module 124 may perform control such that the first camera 180-1 is activated. When the electronic device 101 operates in the video-shooting mode, the image size of which is relatively small, the camera control module 124 may perform control such that the second camera 180-2 is activated.

Figure 2:
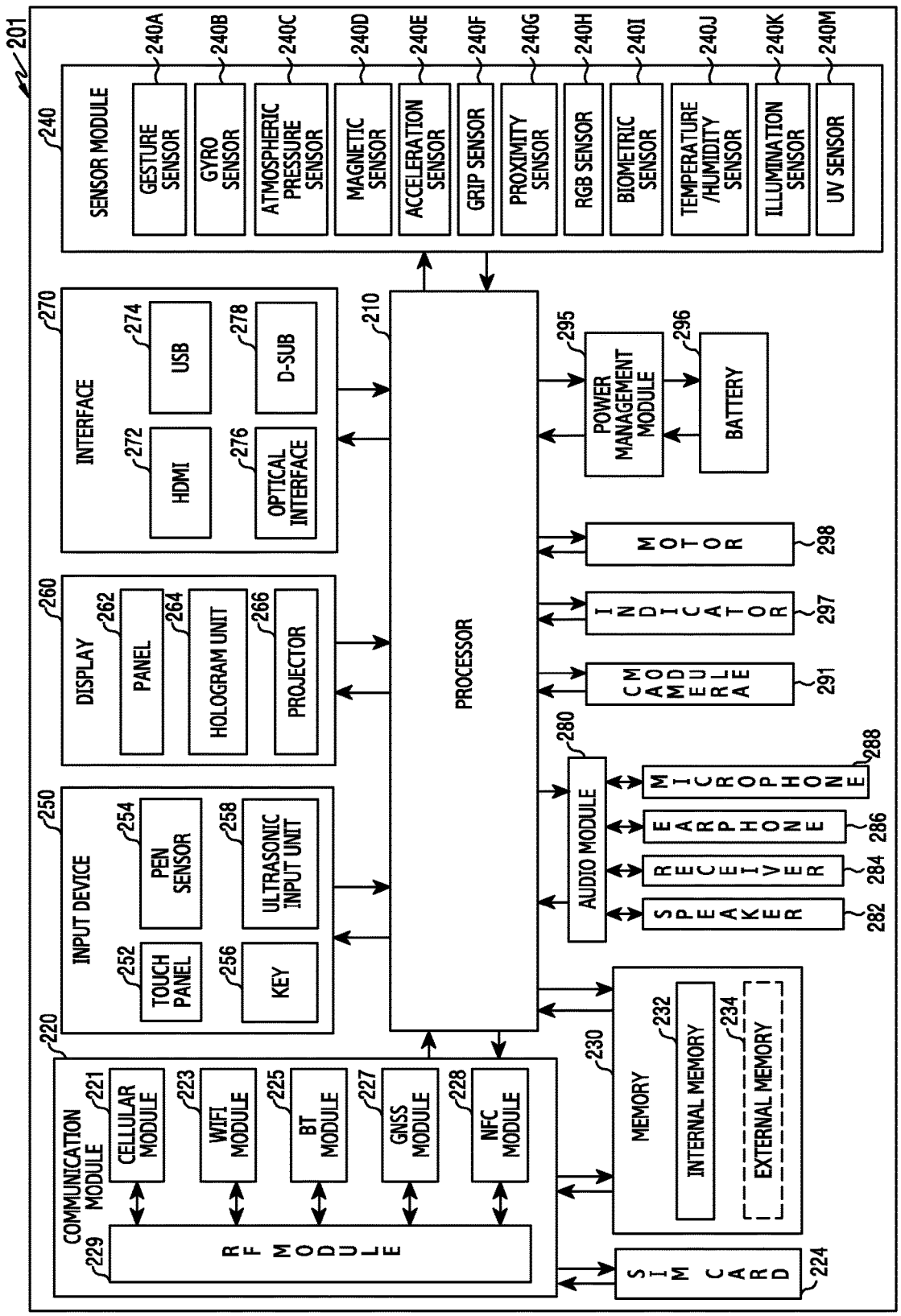
FIG. 2 illustrates a block diagram of an electronic device according to various embodiments of the present disclosure.

FIG. 2 illustrates a block diagram of an electronic device 201 according to various embodiments of the present disclosure. For example, the electronic device 201 may include the entirety or a part of the electronic device 101 illustrated in FIGS. 1A-1C. The electronic device 201 may include at least one processor 210 (e.g., an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be implemented as, for example, a System on Chip (SoC). According to an embodiment, the processor 210 may further include a graphic processing unit (GPU) and/or an image signal processor (ISP). The processor 210 may also include at least some (e.g., the cellular module 221) of the elements illustrated in FIG. 2. The processor 210 may load, in a volatile memory, instructions or data received from at least one of the other elements (e.g., a non-volatile memory), process the loaded instructions or data, and store the resultant data in the non-volatile memory.

According to an embodiment, in the state in which a preview image of a first shooting mode is displayed, when an input of a second shooting mode that supports a different view angle is received, the processor 210 may control the display 260 such that a preview image corresponding to the second shooting mode is displayed. For example, the processor 210 may edit the preview image of the first shooting mode to correspond to the size of the preview image of the second shooting mode.

The communication module 220 may have a configuration equal or similar to that of the communication interface 170 of FIG. 1A. The communication module 220 may include, for example, a cellular module 221, a Wi-Fi module 223, a Bluetooth module 225, a GNSS module 227, an NFC module 228, and an RF module 229.

The cellular module 221 may provide, for example, a voice call, a video call, a text message service, an Internet service, or the like through a communication network. According to an embodiment of the present disclosure, the cellular module 221 may identify or authenticate the electronic device 201 in the communication network using a subscriber identification module (e.g., a SIM card) 224. According to an embodiment, the cellular module 221 may perform at least some of the functions that the AP 210 may provide. According to an embodiment, the cellular module 221 may include a communication processor (CP).

In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (e.g., an RF signal). The RF module 229 may include, for example, a transceiver, a power amp module (PAM), a frequency filter, a low noise amplifier (LNA), an antenna, or the like.

According to another embodiment, at least one of the cellular module 221, the Wi-Fi module 223, the Bluetooth module 225, the GNSS module 227, and the NFC module 228 may transmit/receive an RF signal through a separate RF module. The subscriber identification module 224 may include, for example, a card that includes a subscriber identity module or an embedded SIM, and may contain unique identification information (e.g., an integrated circuit card identifier (ICCID)) or subscriber information (e.g., an international mobile subscriber identity (IMSI)).

The memory 230 (e.g., the memory 130 of FIGS. 1A-1C) may include, for example, an embedded memory 232 or an external memory 234. The embedded memory 232 may include, for example, at least one of a volatile memory (e.g., a DRAM, an SRAM, an SDRAM, or the like) and a non-volatile memory (e.g., a one-time programmable ROM (OTPROM), a PROM, an EPROM, an EEPROM, a mask ROM, a flash ROM, a flash memory, a hard disc drive, or a solid-state drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to react to a touch (touch coordinates) to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (e.g., a microphone 288) to identify data corresponding to the detected ultrasonic waves.

The display 260 (e.g., the display 160 of FIGS. 1A-1C) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or force sensor) capable of measuring pressure information of a user's touch (e.g., pressure coordinates and pressure strength). The pressure sensor may be implemented so as to be integrated with the touch panel 252 or may be implemented as one or more sensors separate from the touch panel 252. According to an embodiment, the panel 262 may include a fingerprint sensor capable of detecting fingerprint information of a user's touch (e.g., a fingerprint image). The fingerprint sensor may be implemented so as to be integrated with the touch panel 252 or may be implemented as one or more sensors separate from the touch panel 252. The hologram device 264 may show a three-dimensional image in the air using light interference. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) interface 278. The interface 270 may be included, for example, in the communication interface 170 illustrated in FIG. 1A. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 150 illustrated in FIG. 1A. The audio module 280 may process sound information that is input or output through, for example, a speaker 282, a receiver 284, earphones 286, the microphone 288, and the like. The camera module 291 (e.g., the camera 180 of FIGS. 1A-1C) is, for example, a device capable of shooting a still image (picture) and a video. According to an embodiment, the camera module 291 may include one or more image sensors (e.g., a front sensor or a rear sensor), a lens, an image signal processor (ISP), or a flash (e.g., an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. The wireless charging method may include, for example, a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the amount of charge remaining in the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, a haptic effect, or the like. The electronic device 201 may include a mobile TV support device (e.g., a GPU) capable of processing media data according to a standard, such as digital multimedia broadcasting (DMB), digital video broadcasting (DVB), mediaFlo™, and the like. Each of the above-described elements described in the present disclosure may be configured with one or more components, and the names of the corresponding elements may be different based on the type of electronic device. According to various embodiments, an electronic device (e.g., the electronic device 201) may not include some elements, or may further include additional elements. Some elements may be coupled to constitute one entity, but the entity may perform the same functions as those of the corresponding elements before being coupled to each other.

Figure 3:
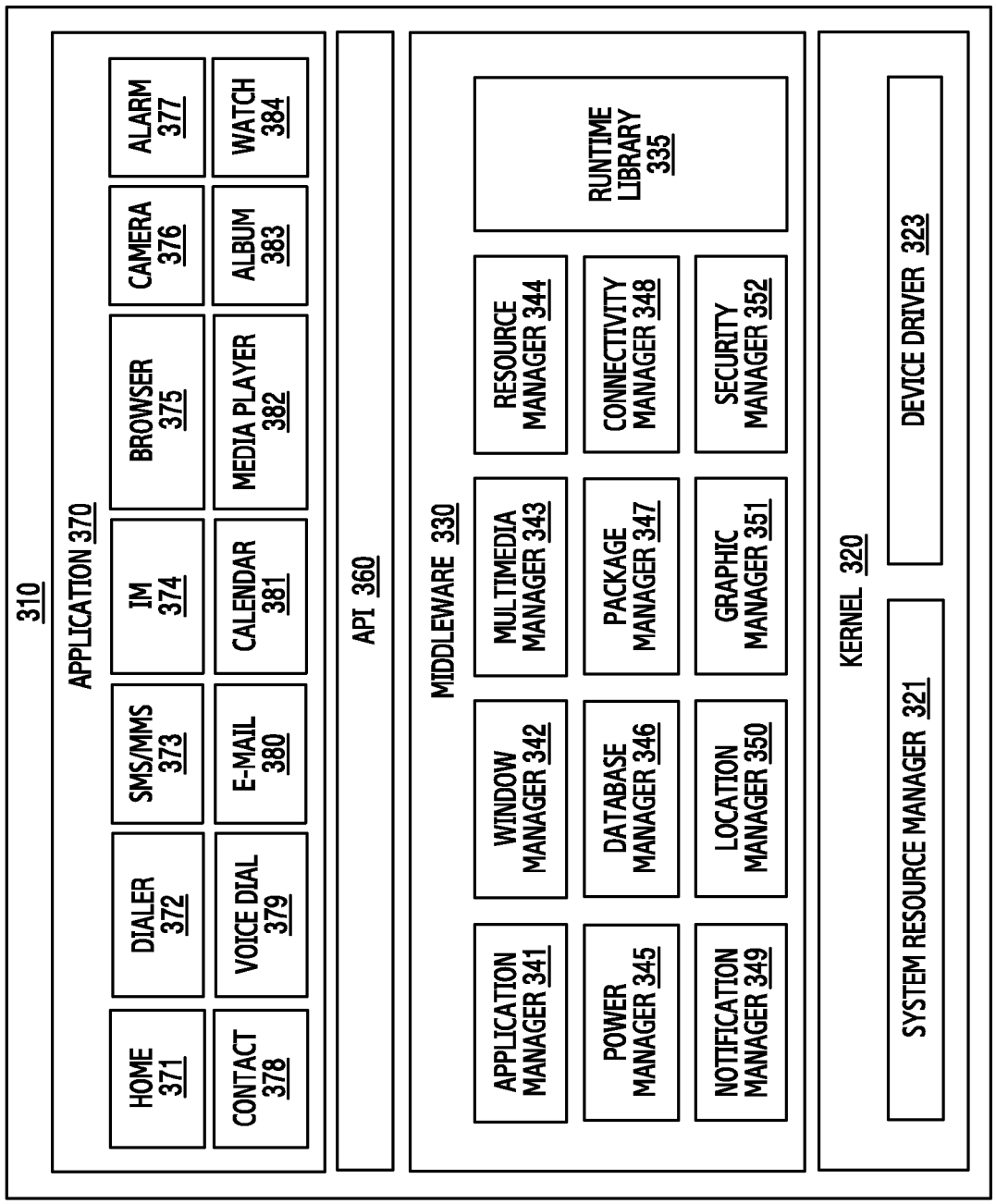
FIG. 3 illustrates a block diagram of a program module according to various embodiments of the present disclosure.

FIG. 3 illustrates a block diagram of a program module according to various embodiments. According to an embodiment, a program module 310 (e.g., the program 140) may include an Operating System (OS) that controls resources relating to an electronic device (e.g., the electronic device 101) and/or various applications (e.g., the application programs 147) that are driven on the operating system. The operating system may include, for example, Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least a part of the program module 310 may be preloaded on the electronic device, or may be downloaded from an external electronic device (e.g., the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file-system manager. The device driver 323 may include, for example, a display driver, a camera driver, a Bluetooth driver, a shared memory driver, a USB driver, a keypad driver, a Wi-Fi driver, an audio driver, a touch device driver, a pressure device driver, or an Inter-Process Communication (IPC) driver.

The middleware 330 may provide, for example, a function used by the applications 370 in common, or may provide various functions to the applications 370 through the API 360 such that the applications 370 can use the limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are executed. The runtime library 335 may manage an input/output, manage a memory, or process an arithmetic function. The application manager 341 may manage, for example, the life cycles of the applications 370. According to an embodiment, the application manager 341 may transmit a biometric information request signal to the security manager 352 based on a content request of the application 370. The application manager 341 may provide, to the application 370, content information provided from the database manager 346. The window manager 342 may manage GUI resources used for a screen. The multimedia manager 343 may identify formats used for reproducing various media files, and may encode or decode a media file using a codec suitable for a corresponding format. The resource manager 344 may manage the source code of the applications 370 or space in memory. The power manager 345 may manage, for example, the capacity or power of a battery and may provide power information used for operating the electronic device. According to an embodiment, the power manager 345 may interoperate with a basic input/output system (BIOS). The database manager 346 may, for example, generate, search, or change a database to be used by the applications 370. According to an embodiment, the database manager 346 may search a database and detect content that matches biometric information provided from the security manager 352. The package manager 347 may manage the installation or update of an application that is distributed in the form of a package file. The connectivity manager 348 may manage, for example, a wireless connection. The notification manager 349 may provide an event (e.g., an arrival message, an appointment, a proximity notification, or the like) to a user. The location manager 350 may manage, for example, the location information of the electronic device. The graphic manager 351 may manage, for example, a graphic effect to be provided to a user and a user interface relating to the graphic effect. The security manager 352 may provide, for example, system security or user authentication. According to an embodiment, the security manager 352 may collect biometric information through the biometric sensor 240I based on a biometric information request signal provided from the application manager 341.

According to an embodiment, the middleware 330 may include a telephony manager for managing a voice or video call function of the electronic device or a middleware module that is capable of forming a combination of the functions of the above-described elements. According to an embodiment, the middleware 330 may provide a module specialized for each type of operating system. The middleware 330 may dynamically remove some of the existing elements, or may add new elements. The API 360 is, for example, a set of API programming functions, and may be provided in different configurations depending on the operating system. For example, in the case of Android or iOS, one API set may be provided for each platform, and in the case of Tizen, two or more API sets may be provided for each platform.

The applications 370 may include, for example, home 371, a dialer 372, SMS/MMS 373, instant messaging (IM) 374, a browser 375, a camera 376, an alarm 377, contacts 378, a voice dialer 379, e-mail 380, a calendar 381, a media player 382, an album 383, a watch 384, health care (e.g., measuring exercise quantity or blood glucose), an application that provides environment information (e.g., atmospheric pressure, humidity, or temperature information), and the like. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device and provide the received notification information to a user. The device management application, for example, may install, delete, or update functions of an external electronic device that communicates with the electronic device (e.g., turning on/off the external electronic device itself (or some elements thereof) or adjusting the brightness (or resolution) of a display) or applications executed in the external electronic device. According to an embodiment, the applications 370 may include applications (e.g., a health care application of a mobile medical appliance) that are designated according to the attributes of an external electronic device. According to an embodiment, the applications 370 may include applications received from an external electronic device. At least some of the program module 310 may be implemented (e.g., executed) by software, firmware, hardware (e.g., the processor 210), or a combination of two or more thereof, and may include a module, a program, a routine, an instruction set, or a process for performing one or more functions.

According to an embodiment, in the state in which a preview image of a first shooting mode is displayed on the display 160 of the electronic device 101, when an input of a second shooting mode that supports a different view angle is received, the camera application 376 may control the display 160 such that a preview image corresponding to the second shooting mode is displayed. For example, the camera application 376 may edit the preview image of the first shooting mode to correspond to the size of the preview image of the second shooting mode.

According to various embodiments of the present disclosure, an electronic device may include a camera, a display, a memory, and at least one processor, and the processor may be configured to perform: displaying, on the display, a plurality of images of an external object obtained using the camera; receiving an input associated with shooting while the plurality of images is displayed; when the input corresponds to a first shooting mode, displaying, on the display, a first indicator corresponding to a property of the first shooting mode to at least temporarily overlap the plurality of images; when the input corresponds to a second shooting mode, displaying, on the display, a second indicator corresponding to a property of the second shooting mode to at least temporarily overlap the plurality of images; and storing at least a part of the plurality of images in the memory based on at least a corresponding shooting mode from among the first shooting mode and the second shooting mode.

According to various embodiments, the processor is configured to perform: generating indicator information based on the difference between the property of the first shooting mode and the property of the second shooting mode; and generating the first indicator or the second indicator using the indicator information.

According to various embodiments, the processor is configured to perform the storing in response to another input which is provided subsequently after the input.

According to various embodiments, the processor is configured to perform: obtaining a still image using at least a part of the plurality of images based on the fact that a shooting mode corresponding to the input is the first shooting mode; and obtaining a video using at least a part of the plurality of images based on the fact that a shooting mode corresponding to the input is the second shooting mode.

According to various embodiments, the processor is configured to perform displaying, on the display, the first indicator or the second indicator to at least correspond to a view angle, a size, a ratio, an editing area, or a combination thereof, which is the priority of the first shooting mode and the priority of the second shooting mode.

According to various embodiments, the camera includes a first camera and a second camera, and the processor is configured to perform: displaying the plurality of images of the external object using at least the first camera based on the fact that the shooting mode corresponding to the input is the first shooting mode; and displaying the plurality of images of the external object using at least the second camera based on the fact that the shooting mode corresponding to the input is the second shooting mode.

According to various embodiments, an electronic device includes a camera, a memory, and at least one processor, and the processor performs control to: receive a camera shooting request; display a preview image of an external object obtained through the camera using first area information based on a first shooting mode in response to the shooting request; receive input corresponding to a second shooting mode in the first shooting mode; and display the preview image using second area information corresponding to the second shooting mode in response to the input.

According to various embodiments, the processor may perform control to: generate third area information based on a difference between the first area information and the second area information; and display the preview image further using the third area information.

According to various embodiments, the input includes a first input and a second input, and the processor performs control to: display the preview image using the second area information in response to the first input; and obtain an image of the external object in the second shooting mode in response to the second input.

According to various embodiments, the first input includes at least one of a press on a hardware button, a touch (touch-down) on a software button, a force touch (force touch-down), a gesture input, a voice input, and a macro instruction, and the second input includes at least one of release of selection of a hardware button or a software button, which is successively generated by the first input, a force touch (force touch-down), a force touch release, a touch movement, a gesture input, a voice input, and a macro instruction.

According to various embodiments, the processor is configured to perform: obtaining a still image of the external object based on the fact that the shooting mode is the first shooting mode; and obtaining a video of the external object based on the fact that the shooting mode is the second shooting mode.

According to various embodiments, the first area information and the second area information include a view angle associated with the preview image, a size, a ratio, an editing area, or a combination thereof.

According to various embodiments, the camera comprises the first camera and the second camera, and the processor performs control to: display a preview image corresponding to the external object received using at least the first camera, based on the fact that the shooting mode is the first shooting mode; and display a preview image corresponding to the external object received using at least the second camera, based on the fact that the shooting mode is the second shooting mode.

Figure 4:
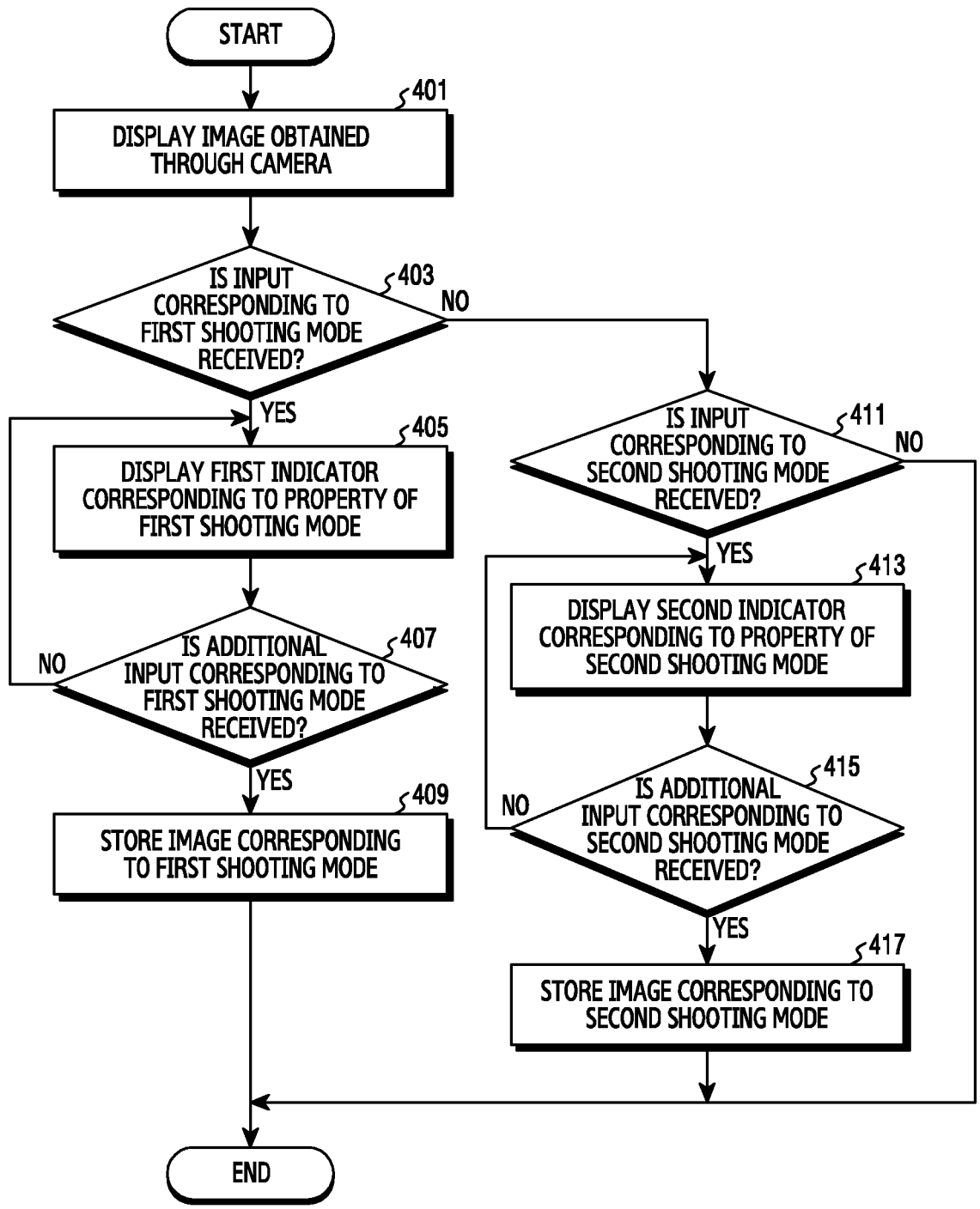
FIG. 4 illustrates a flowchart of a process of displaying an image corresponding to a shooting mode by an electronic device according to various embodiments of the present disclosure.

FIG. 4 illustrates a flowchart of a process of displaying an image corresponding to a shooting mode by an electronic device according to various embodiments of the present disclosure. In the following description, an electronic device may include the electronic device 101 of FIG. 1A or at least a part (e.g., the processor 120) of the electronic device 101.

Referring to FIG. 4, the electronic device may display, on a display, an image collected through a camera electrically connected to the electronic device in operation 401. For example, when an input corresponding to a camera service is received, the processor 120 may perform control such that the camera 180 is activated. The processor 120 may convert the image collected through the activated camera 180 into a form that is displayable on the display. The processor 120 may control the display 160 such that the converted image is displayed.

The electronic device may determine whether an input corresponding to a first shooting mode is received in operation 403. For example, the input corresponding to the first shooting mode may include at least one of a press on a hardware button corresponding to the first shooting mode, a touch (touch-down) on a software button (icon), a force touch (force touch-down) on a software button, a gesture input, a voice input, and a macro instruction.

When the input corresponding to the first shooting mode is received, the electronic device may display a first indicator corresponding to a property of the first shooting mode in operation 405. For example, the processor 120 may determine the size of a preview image based on at least one of a view angle corresponding to the first shooting mode, the size of an image, the aspect ratio of an image, and an editing area. The processor 120 may control the display 160 such that an image collected through the camera 180 is edited to correspond to the preview image size, and the edited image may then be displayed. For example, the processor 120 may control the display 160 so as to display an image collected through at least one first camera corresponding to the first shooting mode from among a plurality of cameras included in the camera 180.

The electronic device may determine whether an additional input corresponding to the first shooting mode is received in operation 407. For example, the additional input corresponding to the first shooting mode may be an input for obtaining an image, and may include at least one of release of selection of a hardware button or a software button corresponding to the first shooting mode, a force touch, a force touch release, a touch movement, a gesture input, a voice input, and a macro instruction.

When additional input corresponding to the first shooting mode is not received, the electronic device may display the first indicator corresponding to the property of the first shooting mode in operation 405. For example, the processor 120 may control the display 160 such that the preview image corresponding to the first shooting mode is continuously displayed.

When the additional input corresponding to the first shooting mode is received, the electronic device may store an image corresponding to the first shooting mode in operation 409. For example, when an additional input corresponding to a picture-shooting mode is received, the processor 120 may obtain a still image (picture) using at least a part of a plurality of images collected through the camera 180. The processor 120 may control the memory 130 such that the still image is stored.

When the additional input corresponding to the first shooting mode is not received, the electronic device may determine whether an input corresponding to a second shooting mode is received in operation 411. For example, the input corresponding to the second shooting mode may include at least one of a press on a hardware button corresponding to the second shooting mode, a touch on a software button (icon), a force touch on a software button, a gesture input, a voice input, and a macro instruction.

When the input corresponding to the second shooting mode is received, the electronic device may display a second indicator corresponding to the property of the second shooting mode in operation 413. For example, the processor 120 may determine the size of a preview image based on at least one of a view angle corresponding to the second shooting mode, the size of an image, the aspect ratio of an image, and an editing area. The processor 120 may control the display 160 such that a preview image is edited to correspond to the preview image size, and the edited image may then be displayed. For example, the processor 120 may control the display 160 so as to display an image collected through at least one second camera corresponding to the second shooting mode from among a plurality of cameras included in the camera 180.

The electronic device may determine whether an additional input corresponding to the second shooting mode is received in operation 415. For example, the additional input corresponding to the second shooting mode may be input for obtaining an image, and may include at least one of release of selection of a hardware button or a software button corresponding to the second shooting mode, a force touch, a force touch release, a touch movement, a gesture input, a voice input, and a macro instruction.

When the additional input corresponding to the second shooting mode is not received, the electronic device may display the second indicator corresponding to the property of the second shooting mode in operation 413. For example, the processor 120 may control the display 160 such that the preview image corresponding to the second shooting mode is continuously displayed.

When the additional input corresponding to the second shooting mode is received, the electronic device may store an image corresponding to the second shooting mode in operation 417. For example, when additional input corresponding to a video-shooting mode is received, the processor 120 may obtain a video using at least a part of a plurality of images collected through the camera 180. The processor 120 may control the memory 130 such that the video is stored.

Figure 5:
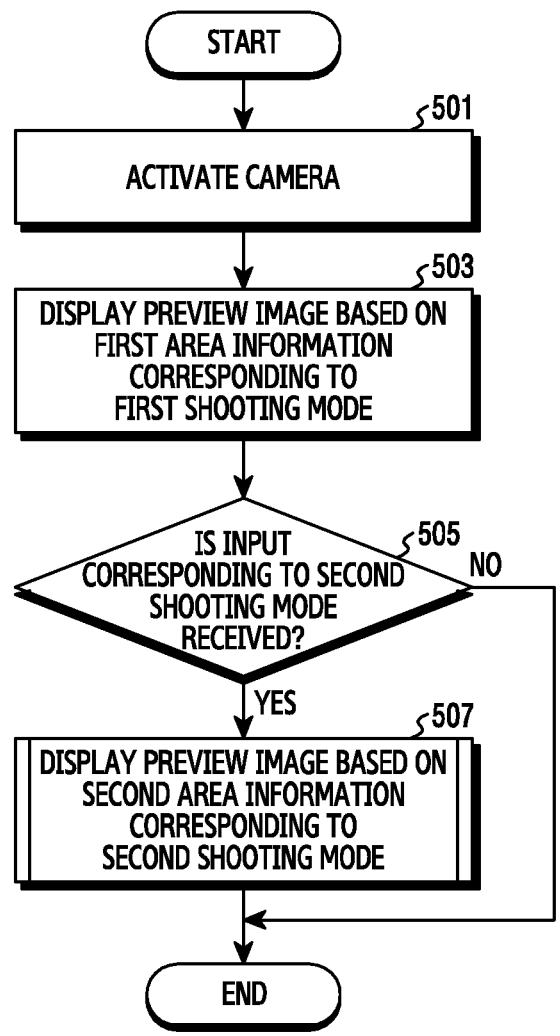
FIG. 5 illustrates a flowchart of a process in which an electronic device converts a preview image based on the conversion of a shooting mode according to various embodiments of the present disclosure.

FIG. 5 illustrates a flowchart of a process in which an electronic device converts a preview image based on the conversion of a shooting mode according to various embodiments of the present disclosure. FIGS. 6A-6D illustrate diagrams of screen configurations that display a preview image corresponding to a shooting mode in an electronic device according to various embodiments of the present disclosure. In the following description, the electronic device may include the electronic device 101 or at least a part (e.g., the processor 120) of the electronic device 101 of FIG. 1A.

Referring to FIG. 5, the electronic device may activate a camera electrically connected to the electronic device based on an input for a camera service in operation 501. For example, when an input for selecting a camera icon displayed on the display 160 is received, the processor 120 may perform control such that the camera 180 is activated. For example, when a gesture input corresponding to a camera service is received, the processor 120 may perform control such that the camera 180 is activated.

The electronic device may display a preview image corresponding to a first shooting mode based on first area information corresponding to the first shooting mode in operation 503. For example, when the camera 180 is activated, the processor 120 may obtain the preview image corresponding to the first shooting mode by converting an image collected through the camera 180 such that the image corresponds to the first area information corresponding to the first shooting mode. The processor 120 may control the display 160 such that the preview image corresponding to the first shooting mode is displayed. For example, the first area information may include at least one of a view angle corresponding to the first shooting mode, the size of an image, the aspect ratio of an image, and an editing area. For example, the processor 120 may control the display 160 such that the image collected through the camera 180 is converted to correspond to the first area information, corresponding to a picture-shooting mode, and such that a preview image 600 in the picture-shooting mode is displayed. For example, the preview image 600 in the picture-shooting mode may further include an object (icon) 610 for shooting (capturing) a picture, an object 612 for shooting a video, an object 614 for switching a camera, and an object 616 for setting a camera. Herein, the preview image may include a plurality of images of an external object is sequentially displayed.

Figure 6A:
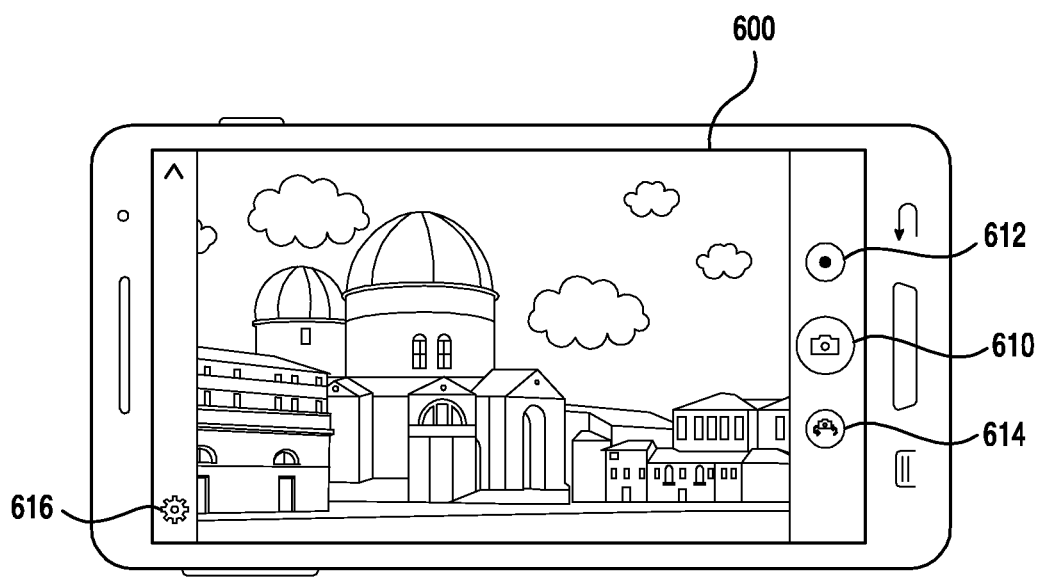
FIGS. 6A-6D illustrate diagrams of screen configurations that display a preview image corresponding to a shooting mode in an electronic device according to various embodiments of the present disclosure.

The electronic device may determine whether an input corresponding to a second shooting mode is received in the state in which the preview image corresponding to the first shooting mode is displayed, in operation 505. For example, the processor 120 may determine whether an input (e.g., a touch input) for selecting the object 612 for shooting a video is received in the state in which the preview image 600 of the first shooting mode is displayed on the display 160 as shown in FIG. 6A.

Figure 6B:
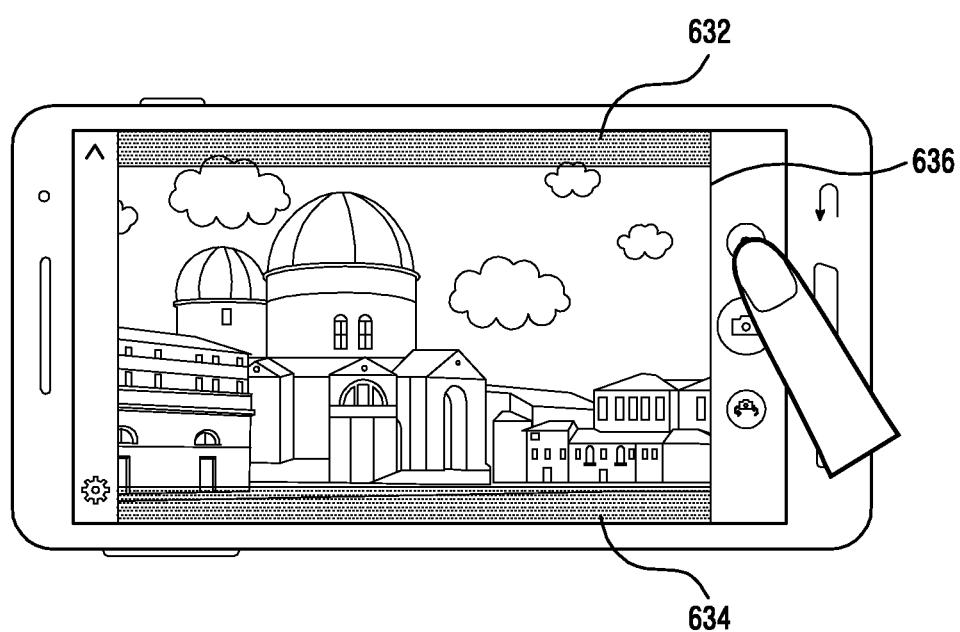
Figure 6C:
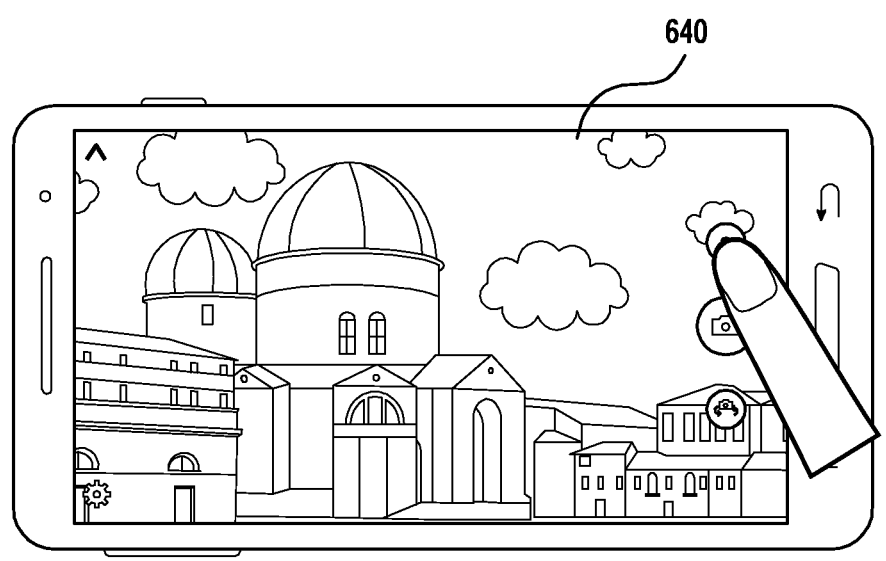

When the input corresponding to the second shooting mode is received in the state in which the preview image corresponding to the first shooting mode is displayed, the electronic device may display a preview image corresponding to the second shooting mode based on second area information corresponding to the second shooting mode in operation 507. For example, the processor 120 may determine at least one view angle control area based on a difference between the first area information (e.g., display area information of an image having an aspect ratio of 4:3) and the second area information (e.g., display area information of an image having an aspect ratio of 16:9). The processor 120 may perform control such that a shadow is displayed in view angle control areas 632 and 634, which are at least a part (e.g., an upper area and a lower area) of the preview image 600 displayed on the display 160, as illustrated in FIG. 6B. In this instance, a remaining area 636 remaining after excluding the view angle control areas 632 and 634 from the preview area 600 may correspond to a view angle of the image collected through the camera 180 based on the second shooting mode. For example, the processor 120 may control the display 160 such that a preview image 640 corresponding to the second shooting mode is displayed after cutting the image collected through the camera 180 based on the at least one view control area, as shown in FIG. 6C. For example, the processor 120 may control the display 160 such that a view angle control area is additionally displayed in the state in which the preview image of the first shooting mode is captured and displayed on the display 160. As an example, the processor 120 may control the display 160 such that the preview image of the first shooting mode is captured, and the captured image may be displayed after cutting at least a part of the captured image based on the view angle control area, and the part may then be displayed.

Figure 6D:
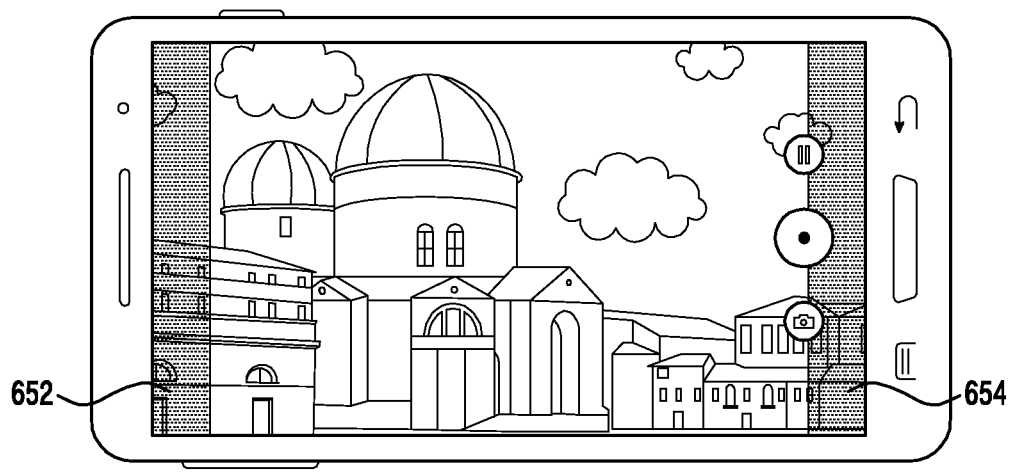

According to an embodiment, the electronic device may display view angle control areas 652 and 654 on the left side and the right side of the display, as illustrated in FIG. 6D, based on an image size of the first shooting mode and an image size of the second shooting mode. For example, the processor 120 may control the display 160 such that a shadow is displayed in the view angle control areas 652 and 654 disposed on the left area and the right area of the preview image, based on a difference between the first area information corresponding to an image having an aspect ratio of 4:3 and the second area information corresponding to an image having an aspect ratio of 1:1.

Figure 7:
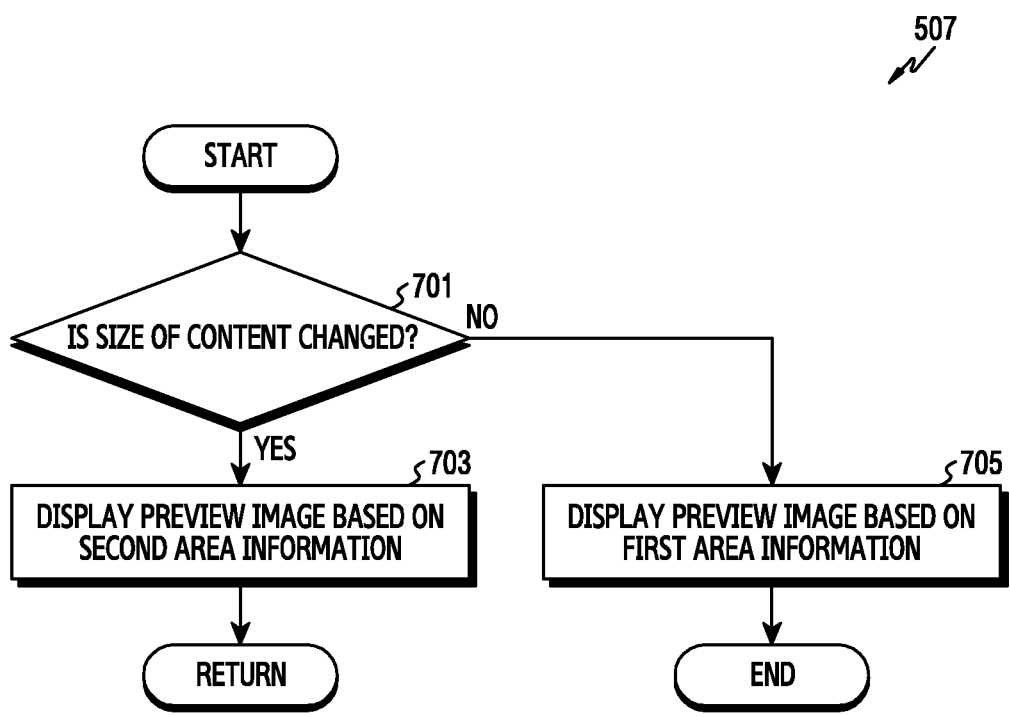
FIG. 7 illustrates a flowchart of a process of selectively converting a preview image by an electronic device according to various embodiments of the present disclosure.

FIG. 7 illustrates a flowchart of a process of selectively converting a preview image by an electronic device according to various embodiments of the present disclosure. Hereinafter, operation 507 of FIG. 5 of displaying the preview image corresponding to the second shooting mode will be described. In the following description, the electronic device may include the electronic device 101 or at least a part (e.g., the processor 120) of the electronic device 101 of FIG. 1A.

Referring to FIG. 7, when an input corresponding to the second shooting mode is received (e.g., operation 505 of FIG. 5) in the state in which the preview image corresponding to the first shooting mode is displayed, the electronic device may determine whether the size of the image is changed based on the second shooting mode in operation 701. For example, the processor 120 may determine whether the first area information corresponding to the first shooting mode and the second area information corresponding to the second shooting mode are the same. For example, the processor 120 may determine whether a predetermined image size (or aspect ratio) of the first shooting mode and a predetermined image size (or aspect ratio) of the second shooting mode are the same.

When the size of the image is changed, the electronic device may display the preview image corresponding to the second shooting mode based on the second area information corresponding to the second shooting mode in operation 703. For example, the processor 120 may control the display 160 such that the preview image displayed on the display 160 based on the first area information corresponding to the first shooting mode is changed based on the second area information. For example, when an image having an aspect ratio of 4:3 is obtained in the first shooting mode and an image having an aspect ratio of 16:9 is obtained in the second shooting mode, the processor 120 may determine that the image size is changed. For example, when an image having an aspect ratio of 4:3 or an image having an aspect ratio of 16:9 is obtained in the first shooting mode and an image having an aspect ratio of 1:1 is obtained in the second shooting mode, the processor 120 may determine that the image size is changed. For example, when an image having an aspect ratio of 1:1 is obtained in the first shooting mode and an image having an aspect ratio of 16:9 is obtained in the second shooting mode, the processor 120 may determine that the image size is changed. For example, even if the ratio of an image obtained in the first shooting mode and the ratio of an image obtained in the second shooting mode are the same, when a stabilization function is applied in any one shooting mode, the processor 120 may determine that the image size is changed.

When the image size is maintained, the electronic device may maintain the preview image displayed based on the first area information in operation 705. For example, when the image size of the first shooting mode and the image size of the second shooting mode are the same, the processor 120 may determine that preview images of the first shooting mode and the second shooting mode are collected at the same view angle of the camera 180. Accordingly, the processor 120 may perform control such that the preview image displayed on the display 160 is maintained. For example, when the aspect ratio of an image obtained in the first shooting mode and the aspect ratio of an image obtained the second shooting mode are the same, and a stabilization function is not applied, the processor 120 may determine that the image size is maintained.

Figure 8:
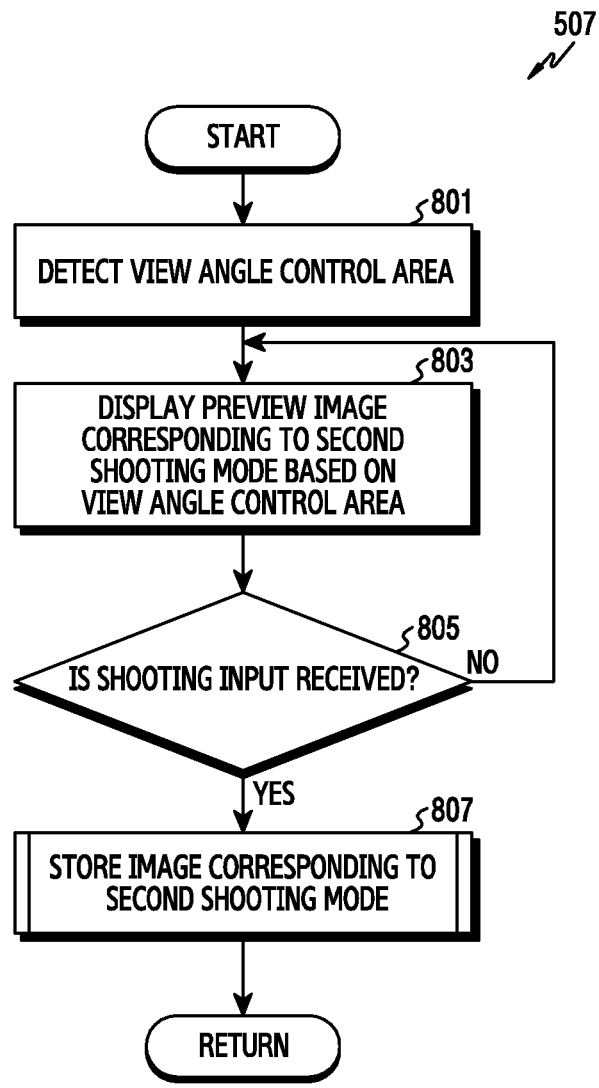
FIG. 8 illustrates a flowchart of a process of storing an image corresponding to a shooting mode by an electronic device according to various embodiments of the present disclosure.

FIG. 8 illustrates a flowchart of a process of storing an image corresponding to a shooting mode by an electronic device according to various embodiments of the present disclosure. Hereinafter, operation 507 of FIG. 5 of displaying the preview image corresponding to the second shooting mode will be described. In the following description, the electronic device may include the electronic device 101 or at least a part (e.g., the processor 120) of the electronic device 101 of FIG. 1A.

Referring to FIG. 8, when an input corresponding to the second shooting mode is received (operation 505 of FIG. 5) in the state in which the preview image corresponding to the first shooting mode is displayed, the electronic device may detect at least one view angle control area in operation 801. For example, the view angle control area may be determined based on at least one of the size (e.g., view angle) of an image sensor included in the camera 180, the size of the display 160 (e.g., the size of a display area), first area information, second area information, the location of a preview image corresponding to the first shooting mode, the location of a preview image corresponding to the second shooting mode, and a video stabilization margin value. For example, when an image having an aspect ratio of 4:3 is obtained in the first shooting mode and an image having an aspect ratio of 16:9 is obtained in the second shooting mode, the processor 120 may determine view angle control areas to be disposed in the upper area and the lower area of the preview image of the first shooting mode. For example, the view angle control area in the upper area may be set to have the height obtained using Equation 1, from the upper end of the preview image of the first shooting mode.

$$\text{Height of view angle control area} = ((\text{height of the preview image of the first shooting mode} - (9/16) \times \text{width of the preview image of the first shooting mode}))/2 \quad \text{Equation 1}$$

For example, the view angle control area in the upper area may be set to have the height obtained using Equation 1, from the lower end of the preview image of the first shooting mode.

For example, when an image having an aspect ratio of 4:3 is obtained in the first shooting mode and an image having an aspect ratio of 1:1 is obtained in the second shooting mode, the processor 120 may determine view angle control areas to be disposed on the left area and the right area of the preview image of the first shooting mode. For example, the view angle control area on the left side may be set to have the width obtained using Equation 2, from the left side of the preview image of the first shooting mode.

$$\text{Width of view angle control area} = (\text{width of the preview image of the first shooting mode} - \text{height of the preview image of the first shooting mode})/2 \quad \text{Equation 2}$$

For example, the view angle control area on the right side may be set to have the width obtained using Equation 2, from the right side of the preview image of the first shooting mode.

The electronic device may display the preview image corresponding to the second shooting mode on the display based on the view angle control area in operation 803. For example, the processor 120 may control the display 160 such that a shadow is displayed in at least a part corresponding to a view angle control area in the preview image of the first shooting mode displayed on the display 160. For example, the processor 120 may cut at least a part corresponding to a view angle control area from the preview image of the first shooting mode displayed on the display 160, and obtain the preview image corresponding to the second shooting mode. The processor 120 may control the display 160 such that the preview image corresponding to the second shooting mode is displayed. For example, when the preview image of the first shooting mode corresponds to an image collected through the camera 180, the processor 120 may obtain the preview image corresponding to the second shooting mode by cutting at least a part corresponding to a view angle control area from the image collected through the camera 180. For example, when a touch input corresponding to the second shooting mode is detected in the state in which the preview image corresponding to the first shooting mode is displayed, the processor 120 may control the display 160 such that the preview image corresponding to the second shooting mode is displayed while the touch input corresponding to the second shooting mode is maintained.

The electronic device may determine whether a shooting input corresponding to the second shooting mode is received in operation 805. For example, the shooting input corresponding to the second shooting mode may include an event that is successfully generated by an input which corresponds to the second shooting mode and has been received in operation 505 of FIG. 5. For example, the processor 120 may control the display 160 such that the preview image corresponding to the second shooting mode is displayed based on a touch input which corresponds to the second shooting mode and has been detected in the state in which the preview image corresponding to the first shooting mode is displayed (for example, operation 803). When the touch input corresponding to the second shooting mode is released, the processor 120 may determine that the shooting input corresponding to the second shooting mode is received. When a force input corresponding to the touch input of the second shooting mode is received, the processor 120 may determine that the shooting input corresponding to the second shooting mode is received. For example, when a touch movement (swipe) in a first direction, which corresponds to the touch input of the second shooting mode, is detected, the processor 120 may determine that the shooting input corresponding to the second shooting mode is received.

When the shooting input corresponding to the second shooting mode is received, the electronic device may store an image corresponding to the second shooting mode in operation 807. For example, when an input (touch input) for selecting the object 612 for shooting a video is released in the state in which the preview image of the video-shooting mode is displayed, as illustrated in the FIG. 6C, the processor 120 may shoot a predetermined size video of an external object. For example, the predetermined size may correspond to the size of a preview image of a video-shooting mode.

Figure 9A:
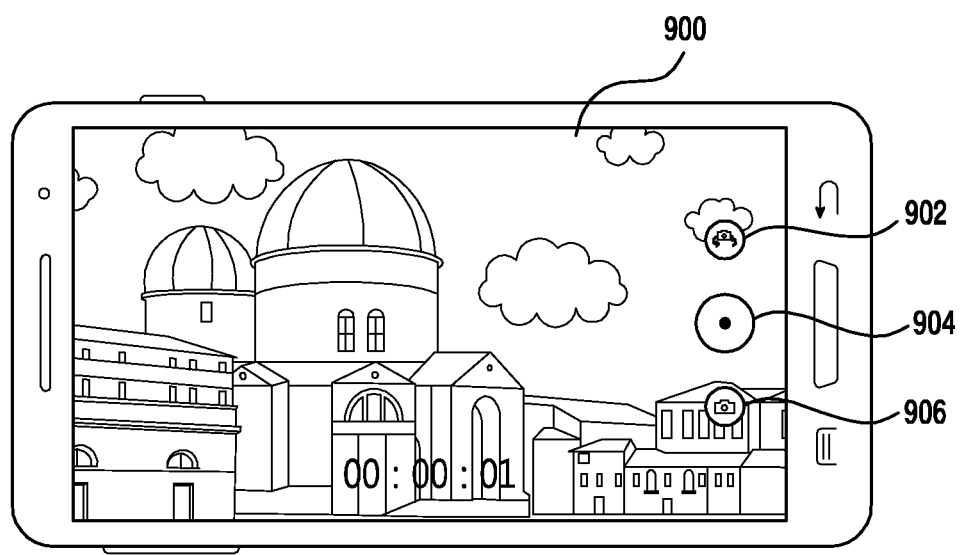
FIGS. 9A and 9B illustrate diagrams of screen configurations that display a preview image corresponding to a picture-shooting mode in an electronic device according to various embodiments of the present disclosure.
Figure 9B:
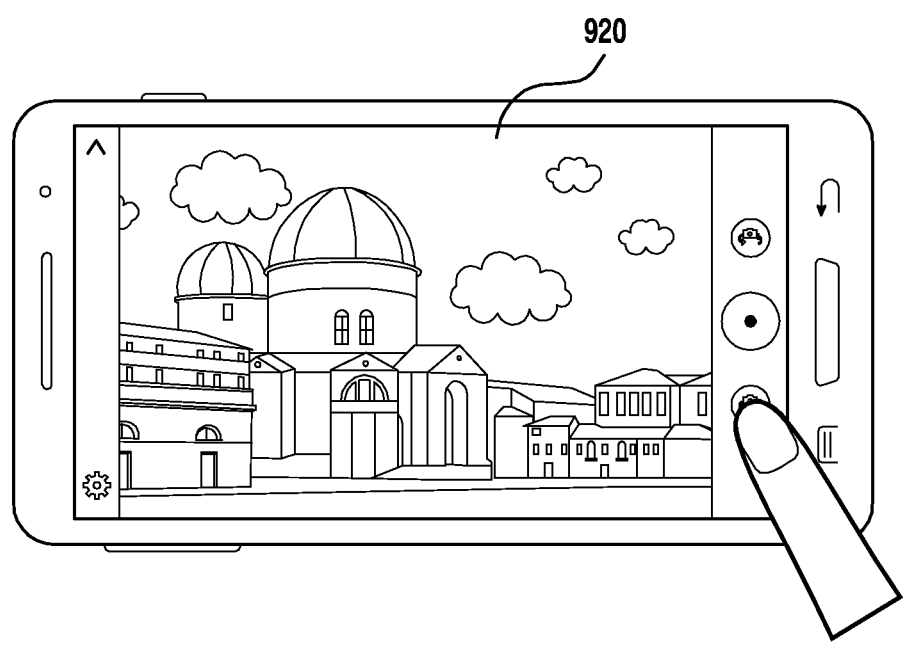

FIGS. 9A and 9B illustrates diagrams of screen configurations that display a preview image corresponding to a picture-shooting mode in an electronic device according to various embodiments of the present disclosure. In the following description, the electronic device may include the electronic device 101 or at least a part (e.g., the processor 120) of the electronic device 101 of FIG. 1A.

According to an embodiment, when a camera service is set to a video-shooting mode as shown in FIG. 9A, the electronic device may display, on a display, a preview image 900 in a size (e.g., an aspect ratio of 16:9) corresponding to the video-shooting mode. For example, the display 160 may display an object 902 for shooting a video, an object 904 for switching a camera, and an object 906 for capturing a still image in the preview image 900 in an overlay manner.

According to an embodiment, when an input (e.g., a touch input) for selecting the object 906 for capturing a still image is received in the state in which the preview image 900 corresponding to the video-shooting mode is displayed, as illustrated in FIG. 9A, the electronic device may detect a view angle control area for displaying a preview image of a picture-shooting mode. For example, the processor 120 may detect a view angle control area based on a difference in image sizes between the video-shooting mode and the picture-shooting mode.

According to an embodiment, the electronic device may display, on the display 160, a preview image 920 corresponding to the picture-shooting mode based on the view angle control area as illustrated in FIG. 9B. For example, the camera 180 may collect an image having an aspect ratio of 4:3 through an image sensor. When a preview image corresponding to the video-shooting mode having an aspect ratio of 16:9 is provided, the processor 120 may cut the view angle control area from the image collected through the camera 180, and may obtain a preview image corresponding to the video-shooting mode. When an input (e.g., a touch input) for selecting the object 906 for capturing a still image is received, the processor 120 may determine a view angle control area for displaying an image having an aspect ratio of 4:3, which corresponds to the picture-shooting mode. Since the size of the image collected through the camera 180 is the same as the image size of the picture-shooting mode, the processor 120 may control the display 160 such that the image collected through the camera 180 is displayed as the preview image of the picture-shooting mode.

According to an embodiment, when an input (e.g., a touch input) for selecting the object 906 for capturing a still image is maintained, the electronic device may maintain the display of the preview image 920 of the picture-shooting mode as illustrated in FIG. 9B.

According to an embodiment, when a shooting input corresponding to the picture-shooting mode is received, the electronic device may obtain a picture (still image) of an external object. For example, the shooting input corresponding to the picture-shooting mode may include release of an input for selecting the object 906 for capturing a still image or force input corresponding to the object 906 for capturing a still image.

Figure 10:
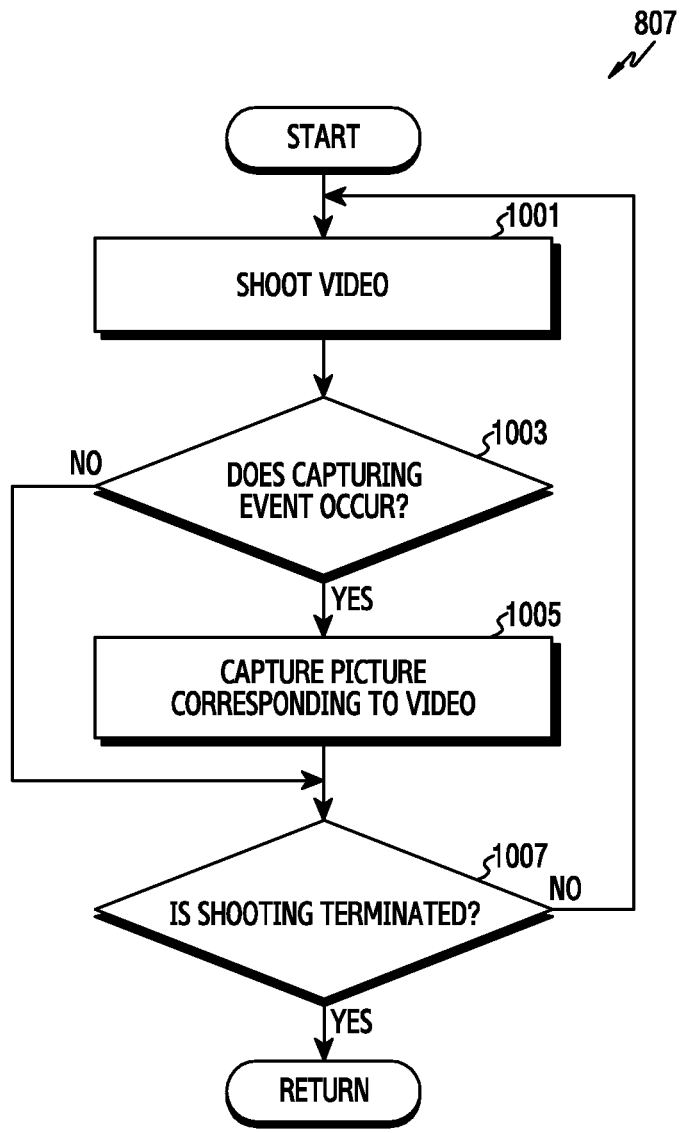
FIG. 10 illustrates a flowchart of a process in which an electronic device captures a picture image during video shooting according to various embodiments of the present disclosure.

FIG. 10 illustrates a flowchart of a process of capturing a picture image during video shooting by an electronic device according to various embodiments of the present disclosure. Hereinafter, operation 807 of FIG. 8 of storing an image corresponding to the second shooting mode will be described. In the following description, the electronic device may include the electronic device 101 or at least a part (e.g., processor 120) of the electronic device 101 of FIG. 1A.

Referring to FIG. 10, when the shooting input corresponding to the video-shooting mode (e.g., the second shooting mode) is received (e.g., operation 805 of FIG. 8), the electronic device may shoot a video of at least one external object through a camera in operation 1001. For example, the processor 120 may perform image processing of the image collected through the camera 180. The processor 120 may control the memory 130 such that the entirety or at least a part of the image-processed image is encoded and is stored.

In operation 1003, the electronic device may determine whether a capturing event occurs while video shooting is performed. For example, when video shooting is performed, the processor 120 may control the display 160 such that at least one from among an object for pausing video shooting, an object for terminating video shooting, and an object for capturing a still image is displayed in at least a part of the video that is being shot. The processor 120 may determine whether an input (e.g., a touch input) for selecting the object for capturing a still image is received while video shooting is performed.

When the capturing event does not occur while video shooting is being performed, the electronic device may determine whether video shooting is terminated in operation 1007. For example, the processor 120 may determine whether an input (a touch input) for selecting the object for pausing video shooting or the object for terminating video shooting is received while video shooting is performed.

The electronic device may capture a picture corresponding to a video when the capturing event is detected while video shooting is performed, in operation 1005. For example, the processor 120 may capture a picture using at least a part of the video at the point in time at which the capturing event is detected. For example, the captured image may include an image having a size the same as that of the video that is being shot. For example, the processor 120 may extract at least a part of an image collected through an image sensor of the camera 180, and may obtain a video having a predetermined size (e.g., a ratio of 16:9). When the capturing event is detected while video shooting is performed, the processor 120 may capture a picture using the image collected through the image sensor of the camera 180. For example, the captured image may include an image having a size (e.g., a ratio of 4:3) different from that of the video that is being shot.

In operation 1007, the electronic device may determine whether video shooting is terminated. When video shooting is not terminated, the electronic device may store the video through the camera in operation 1001.

Figure 11:
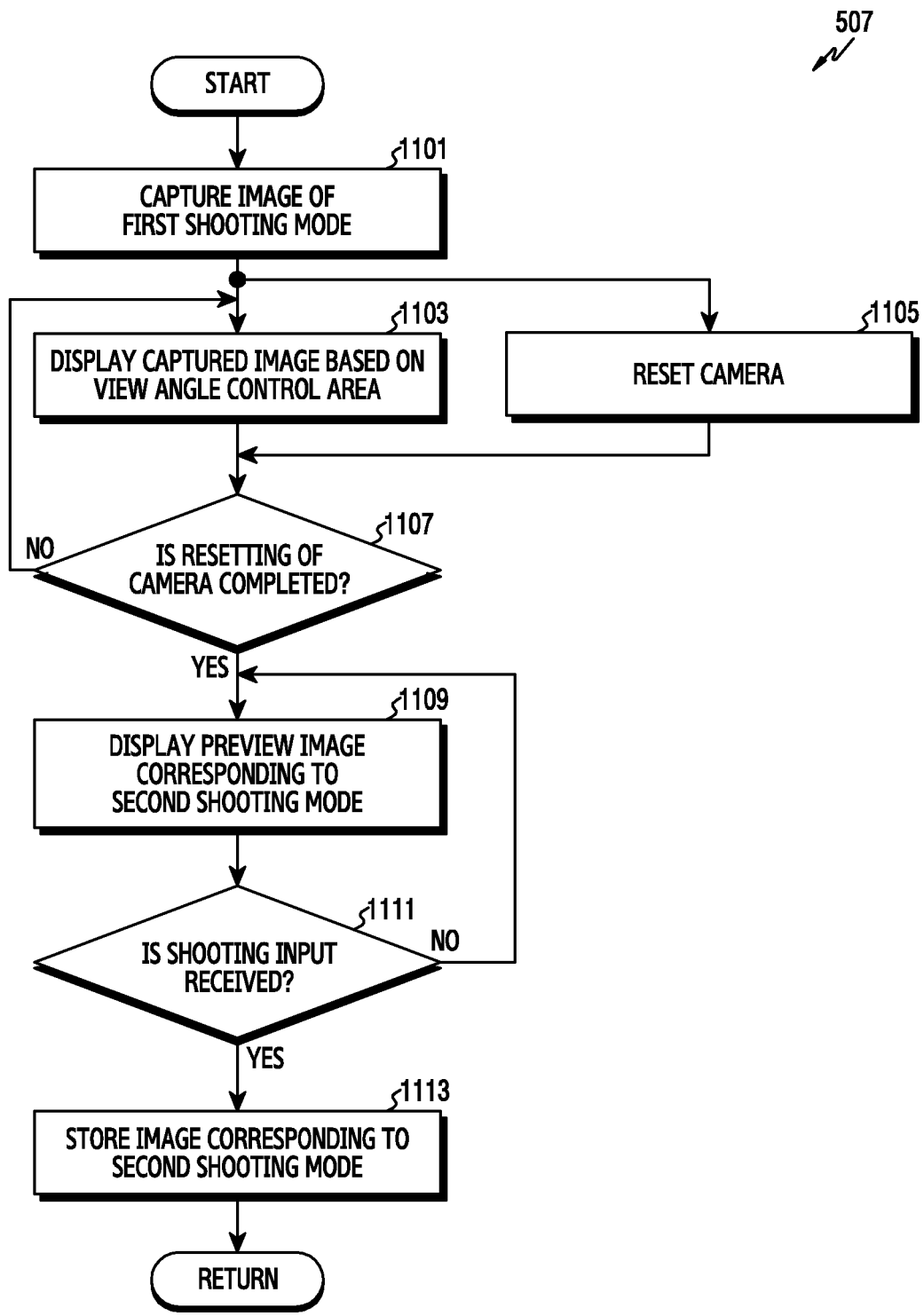
FIG. 11 illustrates a flowchart of a process in which an electronic device resets a camera when a shooting mode is converted according to various embodiments of the present disclosure.

FIG. 11 illustrates a flowchart of a process in which an electronic device resets a camera when a shooting mode is converted according to various embodiments of the present disclosure. Hereinafter, operation 507 of FIG. 5 of displaying the preview image corresponding to the second shooting mode will be described. In the following description, the electronic device may include the electronic device 101 or at least a part (e.g., the processor 120) of the electronic device 101 of FIG. 1A. Hereinafter, the second shooting mode may be assumed to be a mode that shoots an image having a size smaller than that of an image in the first shooting mode.

Referring to FIG. 11, when an input corresponding to the second shooting mode is received (operation 505 of FIG. 5) in the state in which the preview image corresponding to the first shooting mode is displayed, the electronic device may capture the preview image of the first shooting mode in operation 1101. For example, the processor 120 may capture the preview image of the first shooting mode displayed on the display 160 at the point in time at which the input corresponding to the second shooting mode is received.

The electronic device may display, on the display, the captured image based on a view angle control area in operation 1103. For example, the processor 120 may control the display 160 such that a shadow is displayed in at least a part of the captured image corresponding to at least one view angle control area. For example, the processor 120 may cut at least a part of the captured image corresponding to the at least one view angle control area, and may obtain the preview image corresponding to the second shooting mode. The processor 120 may control the display 160 such that the preview image corresponding to the second shooting mode is displayed. For example, the at least one view angle control area may be determined based on the difference between the first area information, corresponding to the first shooting mode, and the second area information, corresponding to the second shooting mode.

Also, the electronic device may reset a camera electrically connected to the electronic device so as to correspond to the second shooting mode in operation 1105. For example, the processor 120 may reset an image sensor of the camera 180 so as to correspond to a predetermined image size (e.g., a image ratio) of the second shooting mode.

In operation 1107, the electronic device may determine whether resetting of the camera is completed. When resetting of the camera is not completed, the electronic device may maintain the display of the captured image, which is displayed on the display based on the view angle control area in operation 1103.

When resetting of the camera is completed, the electronic device may display, on the display, an image collected through the camera as the preview image corresponding to the second shooting mode in operation 1109. For example, the processor 120 may control the display 160 such that the captured image displayed on the display 160 during a camera resetting time is changed to the image collected through the camera 180.

The electronic device may determine whether a shooting input corresponding to the second shooting mode is received in operation 1111. For example, the shooting input corresponding to the second shooting mode may include at least one of release of selection of a hardware button or a software button corresponding to the second shooting mode, a force touch release, a gesture input, a voice input, and a macro instruction.

When the shooting input corresponding to the second shooting mode is not received, the electronic device may display, on the display, the preview image corresponding to the second shooting mode, which is collected through the camera, in operation 1109.

When the shooting input corresponding to the second shooting mode is received, the electronic device may store an image corresponding to the second shooting mode in operation 1113. For example, the processor 120 may control the memory 130 such that a video collected through the reset camera 180 is stored.

Figure 12:
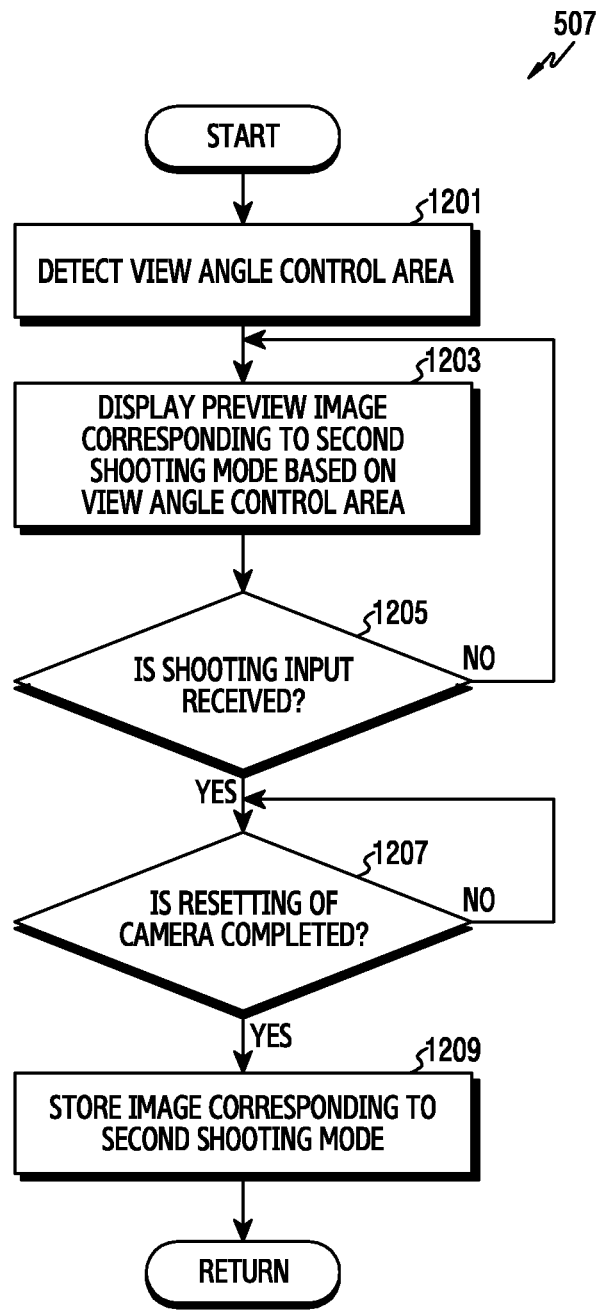
FIG. 12 illustrates a flowchart of a process in which an electronic device resets a camera at a point in time for shooting based on the conversion of a shooting mode according to various embodiments of the present disclosure.

FIG. 12 illustrates a flowchart of a process in which an electronic device resets a camera at a point in time for shooting based on the conversion of a shooting mode according to various embodiments of the present disclosure. Hereinafter, operation 507 of FIG. 5 of displaying the preview image corresponding to the second shooting mode will be described. In the following description, the electronic device may include the electronic device 101 or at least a part (e.g., the processor 120) of the electronic device 101 of FIG. 1A. Hereinafter, the second shooting mode may be assumed to be a mode that shoots an image having a size relatively smaller than an image in the first shooting mode.

Referring to FIG. 12, when an input corresponding to the second shooting mode is received (e.g., operation 505 of FIG. 5) in the state in which the preview image corresponding to the first shooting mode is displayed, the electronic device may detect at least one view angle control area for displaying the preview image of the second shooting mode in operation 1201. For example, the at least one view angle control area may be determined based on at least one of the size (e.g., view angle) of an image sensor included in the camera 180, the size of the display 160 (e.g., the size of a display area), first area information, second area information, the location of the preview image corresponding to the first shooting mode, the location of the preview image corresponding to the second shooting mode, and a video stabilization margin value.

The electronic device may display the preview image corresponding to the second shooting mode on the display based on the view angle control area in operation 1203. For example, the processor 120 may control the display 160 such that a shadow 632 and 634 is displayed in at least a part corresponding to a view angle control area in the preview image 600 of the first shooting mode displayed on the display 160, as illustrated in FIG. 6B. For example, the processor 120 may cut at least a part corresponding to the view angle control area from the preview image of the first shooting mode displayed on the display 160 and obtain the preview image corresponding to the second shooting mode. The processor 120 may control the display 160 such that the preview image 640 corresponding to the second shooting mode is displayed, as illustrated in FIG. 6D.

The electronic device may determine whether a shooting input corresponding to the second shooting mode is received in operation 1205. For example, the processor 120 may determine whether the shooting input corresponding to the second shooting mode is received in at least one form selected from among release of selection of a hardware button or a software button corresponding to the second shooting mode, a force touch release, a gesture input, a voice input, and a macro instruction.

When the shooting input corresponding to the second shooting mode is not received, the electronic device may maintain the display of the preview image corresponding to the second shooting mode in operation 1203.

When the shooting input corresponding to the second shooting mode is received, the electronic device may reset the camera to correspond to the second shooting mode in operation 1207. For example, when a shooting input corresponding to a video-shooting mode is received in operation 1205, the processor 120 may reset an image sensor of the camera 180 to correspond to a predetermined aspect ratio (e.g., a ratio of 16:9) of the video-shooting mode. For example, the processor 120 may control the display 160 such that the preview image corresponding to the second shooting mode is captured and displayed during a camera resetting time for the camera 180.

When resetting of the camera is completed, the electronic device may store an image corresponding to the second shooting mode through the reset camera in operation 1209. For example, the processor 120 may control the memory 130 so as to store a video collected through the camera 180 which is reset to correspond to the video-shooting mode.

Figure 13:
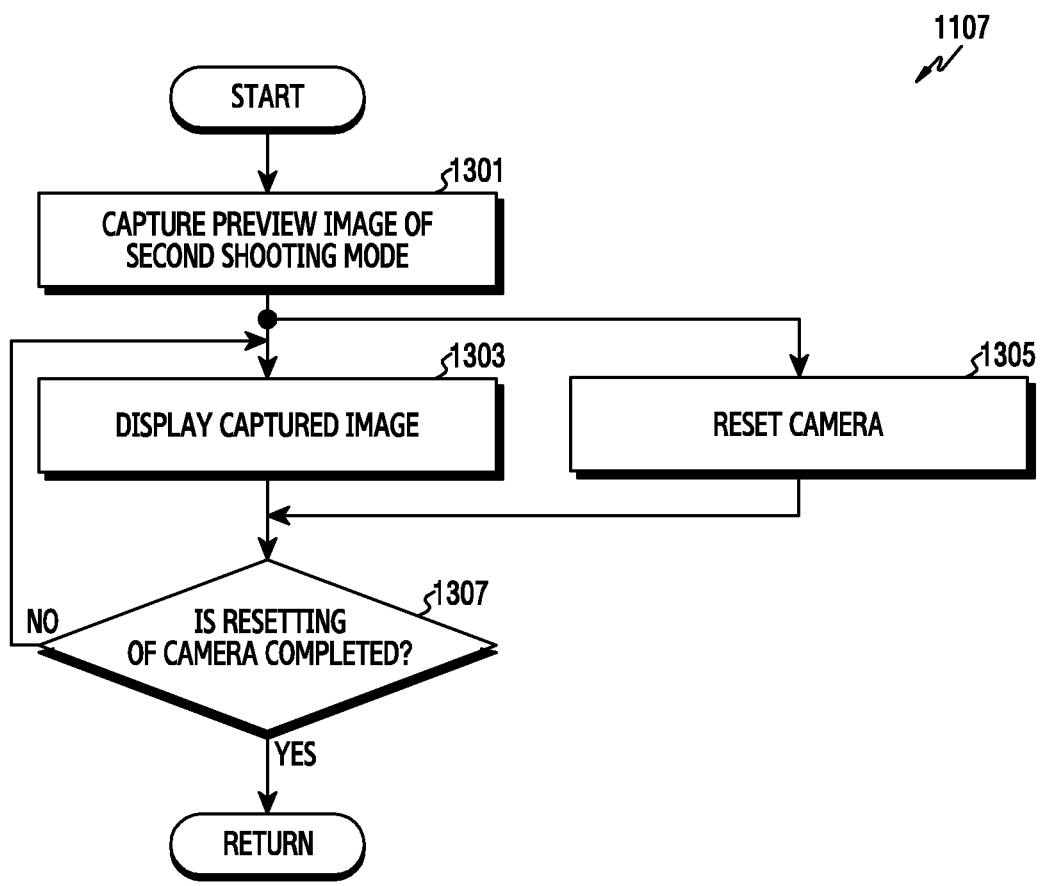
FIG. 13 illustrates a flowchart of a process in which an electronic device displays a captured image while a camera is reset according to various embodiments of the present disclosure.

FIG. 13 illustrates a flowchart of a process in which an electronic device displays a captured image when a camera is reset according to various embodiments of the present disclosure. Hereinafter, operation 1207 of FIG. 12 of resetting the camera will be described. In the following description, the electronic device may include the electronic device 101 or at least a part (e.g., the processor 120) of the electronic device 101 of FIG. 1A.

Referring to FIG. 13, when the shooting input corresponding to the second shooting mode is received (e.g., operation 1205 of FIG. 12) in the state in which the preview image corresponding to the second shooting mode is displayed, the electronic device may capture the preview image of the second shooting mode in operation 1301. For example, the processor 120 may capture, as a still image, the preview image of the second shooting mode, corresponding to the point in time at which the shooting input corresponding to the second shooting mode is received. For example, the preview image of the second shooting mode may include the preview image of the first shooting mode, which is edited based on at least one view angle control area.

The electronic device may display the captured image on the display in operation 1303.

Also, in the state in which the captured image is displayed, the electronic device may reset a camera electrically connected to the electronic device such that the camera corresponds to the second shooting mode in operation 1305. For example, the processor 120 may reset an image sensor of the camera 180 so as to correspond to a predetermined image size of the second shooting mode.

In operation 1307, the electronic device may determine whether resetting of the camera is completed. When resetting of the camera is not completed, the electronic device may maintain the display of the captured image on the display in operation 1303. For example, the processor 120 may control the display 160 such that the display of the captured image is maintained until resetting of the camera 180 is completed.

Figure 14:
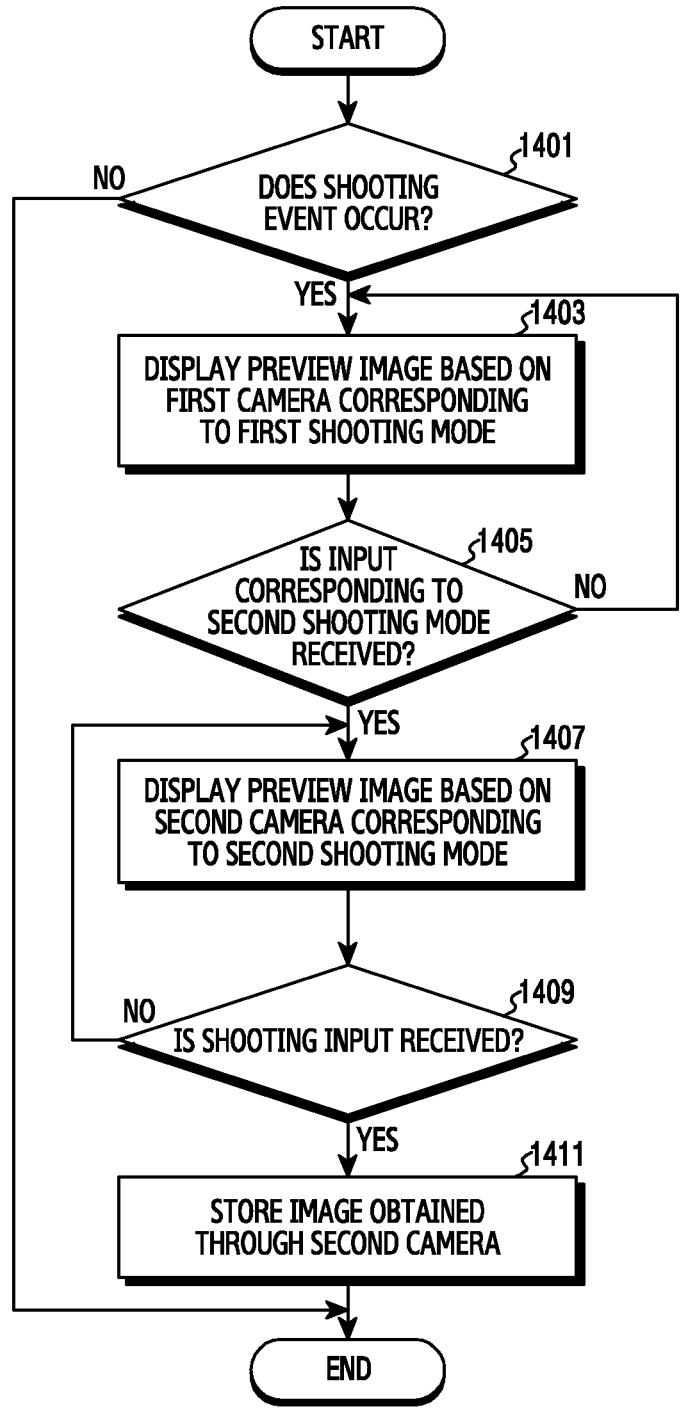
FIG. 14 illustrates a flowchart of a process of converting a shooting mode using a plurality of cameras by an electronic device according to various embodiments of the present disclosure.

FIG. 14 illustrates a flowchart of a process of converting a shooting mode using a plurality of cameras by an electronic device according to various embodiments of the present disclosure. In the following description, the electronic device may include the electronic device 101 or at least a part (e.g., the processor 120) of the electronic device 101 of FIG. 1A.

Referring to FIG. 14, the electronic device may determine whether a shooting event for using a camera electrically connected to an electronic device occurs in operation 1401. For example, the processor 120 may determine whether an input for selecting a camera icon displayed on the display 160 or a gesture input corresponding to a camera service is received.

When the occurrence of the shooting event is detected, the electronic device displays an image collected through a first camera, corresponding to a first shooting mode, on the display as a preview image corresponding to the first shooting mode in operation 1403. For example, when the occurrence of the shooting event is detected, the processor 120 may activate a first camera (e.g., the first camera 180-1 of FIG. 1C) corresponding to the first shooting mode from among a plurality of cameras of the camera 180. The processor 120 may control the display 160 such that an image collected through the first camera is displayed as a preview image corresponding to the first shooting mode. For example, at least one remaining camera, excluding the first camera from the camera 180, may be maintained in a deactivated state.

The electronic device may determine whether an input corresponding to a second shooting mode is received in the state in which the preview image corresponding to the first shooting mode is displayed, in operation 1405. For example, an input corresponding to the second shooting mode may include at least one of a press on a hardware button corresponding to the second shooting mode, a touch (touchdown) on a software button, a force touch (force touchdown), a gesture input, a voice input, and a macro instruction.

When input corresponding to the second shooting mode is not received, the electronic device may display the preview image corresponding to the first shooting mode in operation 1403.

When the input corresponding to the second shooting mode is received in the state in which the preview image corresponding to the first shooting mode is displayed, the electronic device may display an image collected through a second camera corresponding to the second shooting mode as a preview image corresponding to the second shooting mode in operation 1407. For example, when an input corresponding to a video-shooting mode is received in operation 1405 in the state in which a preview image of a picture-shooting mode is displayed, the processor 120 may activate the second camera (e.g., the second camera 180-2 of FIG. 1C), corresponding to the video-shooting mode, from among a plurality of cameras of the camera 180.

The processor 120 may control the display 160 such that an image collected through the second camera is displayed as a preview image corresponding to the video-shooting mode. For example, at least one remaining camera, excluding the second camera from the camera 180, may be maintained in a deactivated state.

The electronic device may determine whether a shooting input corresponding to the second shooting mode is received in operation 1409. For example, the shooting input corresponding to the second shooting mode may include at least one of release of selection of a hardware button or a software button corresponding to the second shooting mode, a force touch release, a gesture input, a voice input, and a macro instruction.

When shooting input corresponding to the second shooting mode is not received in operation 1407, the electronic device may display the preview image corresponding to the second shooting mode.

When the shooting input corresponding to the second shooting mode is received, the electronic device may store an image of an external object obtained through the second camera in operation 1411. For example, when a shooting input corresponding to the video-shooting mode is received, the processor 120 may shoot a video of at least one external object through the second camera.

According to an embodiment, when a shooting input corresponding to the first shooting mode is received in the state in which the preview image corresponding to the first shooting mode is displayed, the electronic device may store an image obtained through the first camera. For example, when a shooting input corresponding to a picture-shooting mode is received, processor 120 may control the memory 130 such that at least a part of the image of an external object collected through the first camera is captured and a still image is stored.

According to various embodiments of the present disclosure, an operation method of an electronic device may include: displaying, on a display, a plurality of images of an external object obtained using a camera electrically connected to the electronic device; receiving an input associated with shooting while the plurality of images is displayed; when the input corresponds to the first shooting mode, displaying, on the display, a first indicator corresponding to a property of the first shooting mode to at least temporarily overlap the plurality of images; when the input corresponds to the second shooting mode, displaying, on the display, a second indicator corresponding to a property of the second shooting mode to at least temporarily overlap the plurality of images; and storing at least a part of the plurality of images in a memory of the electronic device based on at least a corresponding shooting mode from among the first shooting mode and the second shooting mode.

According to various embodiments, the first indicator or the second indicator may be generated using indicator information generated based on the difference between the property of the first shooting mode and the property of the second shooting mode.

According to various embodiments, the storing operation may include storing at least a part of the plurality of images in the memory of the electronic device in response to another input provided subsequent to the input.

According to various embodiments, the storing operation may include: obtaining a still image using at least a part of the plurality of images based on the fact that a shooting mode corresponding to the input is the first shooting mode; and obtaining a video using at least a part of the plurality of images based on the fact that a shooting mode corresponding to the input is the second shooting mode.

According to various embodiments, the first indicator or the second indicator displayed on the display may correspond at least to a view angle, a size, a ratio, an editing area, or a combination thereof, which is the property of the first shooting mode and the priority of the second shooting mode.

According to various embodiments, the operation of displaying the first indicator on the display may include displaying, on the display, the plurality of images of the external object using at least a first camera included in the camera, based on the fact that a shooting mode corresponding to the input is the first shooting mode.

According to various embodiments, the operation of displaying the second indicator on the display may include displaying, on the display, the plurality of images of the external object using at least a second camera included in the camera, based on the fact that a shooting mode corresponding to the input is the second shooting mode.

An electronic device and an operation method thereof according to various embodiments may output information associated with a change in an image size that occurs due to a difference in view angles between shooting modes when a shooting mode of a camera is changed, whereby a user of the electronic device can easily set the composition to be used for obtaining an image.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a camera;
   a display;
   a memory; and
   at least one processor,
   wherein the at least one processor is configured to:
      execute an application using the camera in a first mode;
      control the display to display a first preview image corresponding to the first mode;
      obtain a first user input changing the first mode to a second mode;
      in response to obtaining the first user input:
         capture the first preview image at a point in time at which the first user input is received;
         control the display to display the captured first preview image and an indicator corresponding to the second mode on the captured first preview image during a resetting of the camera to the second mode;
         identify whether the resetting of the camera to the second mode is completed; and
         maintain displaying the captured first preview image and the indicator corresponding to the second mode on the captured first preview image on the display, until the at least one processor identifies that the resetting of the camera to the second mode is completed;
      after the resetting of the camera to the second mode, control the display to display a second preview image corresponding to the second mode, wherein a size of the second preview image is equal to a size of the indicator; and store at least a part of the second preview image in the memory based on a second user input.

2. The electronic device of claim 1, wherein the at least one processor is further configured to:

generate indicator information based on a difference between a property of the first mode and a property of the second mode; and generate the indicator using the indicator information.

3. The electronic device of claim 1, wherein the at least one processor is further configured to:

store at least a part of the first preview image in the memory based on an additional first user input.

4. The electronic device of claim 1, wherein the at least one processor is further configured to:

obtain a still image based on the second preview image of the second mode, if the first mode is a video mode; and obtain a video based on the second preview image of the second mode, if the first mode is a still mode.

5. The electronic device of claim 1, wherein the at least one processor is further configured to:

control the display to display the indicator to correspond at least to a view angle, a size, a ratio, an editing area, or a combination thereof, that is a property of the first mode and a property of the second mode.

6. The electronic device of claim 1, wherein the camera comprises a first camera and a second camera, and the at least one processor is further configured to:

control the display to display the first preview image using at least the first camera based on an input corresponding to the first mode; and control the display to display the second preview image using at least the second camera based on an input corresponding to the second mode.

7. A method for operation of an electronic device, the method comprising:

executing an application using a camera in a first mode;

controlling a display to display a first preview image corresponding to the first mode;

obtaining a first user input changing the first mode to a second mode;

in response to obtaining the first user input, capturing the first preview image at a point in time at which the first user input is received and displaying the captured first preview image and an indicator corresponding to the second mode on the captured first preview image during a resetting of the camera to the second mode;

identifying whether the resetting of the camera to the second mode is completed;

maintaining the displaying the captured first preview image and the indicator corresponding to the second mode on the captured first preview image on the display, until at least one processor identifies that the resetting of the camera to the second mode is completed;

after the resetting of the camera to the second mode, controlling the display to display a second preview image corresponding to the second mode, wherein a size of the second preview image is equal to a size of the indicator; and storing at least a part of the second preview image in a memory based on a second user input.

8. The method of claim 7, wherein the indicator is generated using indicator information generated based on a difference between property of the first mode and a property of the second mode.

9. The method of claim 7, wherein the storing comprises:

storing at least a part of the first preview image in the memory based on an additional first user input.

10. The method of claim 7, wherein the storing comprises:

obtaining a still image based on the second preview image of the second mode, if the first mode is a video mode; and obtaining a video based on the second preview image of the second mode, if the first mode is a still mode.

11. The method of claim 7, wherein the indicator displayed on the display corresponds at least to a view angle, a size, a ratio, an editing area, or a combination thereof, which is a property of the first mode and a property of the second mode.

12. The method of claim 7, wherein the displaying the indicator comprises:

displaying, on the display, the first preview image using at least a first camera included in the camera, based on an input corresponding to the first mode.

13. The method of claim 7, wherein the displaying the indicator comprises:

displaying, on the display, the second preview image using at least a second camera included in the camera, based on an input corresponding to the second mode.

14. An electronic device comprising:

a camera;

a display;

a memory; and at least one processor, wherein the at least one processor is configured to:

execute an application using the camera in a first mode in response to a camera shooting event;

control the display to display a first preview image using first area information based on the first mode;

receive an input corresponding to a second mode;

in response to the input:

capture the first preview image at a point in time at which the input is received;

control the display to display the captured first preview image and an indicator corresponding to the second mode on the captured first preview image during a resetting of the camera to the second mode;

identify whether the resetting of the camera to the second mode is completed; and maintain displaying the captured first preview image and the indicator corresponding to the second mode on the captured first preview image on the display, until the at least one processor identifies that the resetting of the camera to the second mode is completed; and after the resetting of the camera to the second mode, control the display to display a second preview image using second area information corresponding to the second mode, wherein a size of the second preview image is equal to a size of the indicator.

15. The electronic device of claim 14, wherein the at least one processor is further configured to:

generate third area information based on a difference between the first area information and the second area information; and control the display to display the second preview image further using the third area information.

16. The electronic device of claim 14, wherein the input includes a first input and a second input, and
the at least one processor is further configured to:
control the display to display the second preview image using the second area information in response to the first input, and
obtain at least a part of the second preview image in the second mode in response to the second input.

17. The electronic device of claim 16, wherein the first input includes at least one of a press on a hardware button, a touch (touch-down) on a software button, a force touch (force touch-down), a gesture input, a voice input, and a macro instruction, and
the second input includes at least one a release of selection of a hardware button or a software button, which is successively generated by the first input, a force touch (force touch-down), a force touch release, a touch movement, a gesture input, a voice input, and a macro instruction.

18. The electronic device of claim 14, wherein the at least one processor is further configured to:
obtain a still image based on the second preview image of the second mode, if the first mode is a video mode; and
obtain a video based on the second preview image of the second mode, if the first mode is a still mode.

19. The electronic device of claim 14, wherein the first area information and the second area information include a view angle associated with the first preview image, a size, a ratio, an editing area, or a combination thereof.

20. The electronic device of claim 14, wherein the camera comprises a first camera and a second camera, and the at least one processor is further configured to:
control the display to display the first preview image using at least the first camera, based on an input corresponding to the first mode; and
control the display to display the second preview image using at least the second camera, based on the input corresponding to the second mode.

* * * * *